(12) United States Patent
Lu

(10) Patent No.: US 9,760,539 B1
(45) Date of Patent: Sep. 12, 2017

(54) INCREMENTAL SIMPLE LINEAR REGRESSION COEFFICIENT CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 69 days.

(21) Appl. No.: 14/981,197

(22) Filed: Dec. 28, 2015

Related U.S. Application Data

(60) Provisional application No. 62/126,446, filed on Feb. 28, 2015.

(51) Int. Cl.
*G06F 1/02* (2006.01)
*G06F 17/17* (2006.01)
*G06F 1/32* (2006.01)

(52) U.S. Cl.
CPC ............... *G06F 17/17* (2013.01); *G06F 1/32* (2013.01)

(58) Field of Classification Search
CPC .................................. G06F 17/17; G06F 1/32
USPC ......................................................... 708/274
See application file for complete search history.

(56) References Cited

U.S. PATENT DOCUMENTS

| 7,747,413 | B2 | 6/2010 | Ramsey et al. |
| 7,840,377 | B2 | 11/2010 | Ramsey et al. |
| 9,069,726 | B2 | 6/2015 | Lu |
| 2003/0176931 | A1* | 9/2003 | Pednault ........... G06F 17/30539 700/31 |
| 2005/0180502 | A1* | 8/2005 | Puri ..................... H04N 19/159 375/240.03 |
| 2014/0164456 | A1 | 6/2014 | Lu |

FOREIGN PATENT DOCUMENTS

| WO | WO-2014093540 A2 | 6/2014 |
| WO | WO-2014093540 A3 | 9/2014 |

* cited by examiner

*Primary Examiner* — Tan V. Mai

(57) ABSTRACT

The present invention extends to methods, systems, and computing device program products for incrementally calculating simple linear regression coefficients for Big Data or streamed data. Embodiments of the invention include incrementally calculating one or more components of simple linear regression coefficients for a modified computation set based on one or more components of simple linear regression coefficients calculated for a previous computation set and then calculating the simple linear regression coefficients for the modified computation set based on the incrementally calculated components. Incrementally calculating simple linear regression coefficients avoids visiting all data elements in the modified computation set and performing redundant computations thereby increasing calculation efficiency, saving computing resources and reducing computing system's power consumption.

16 Claims, 31 Drawing Sheets

The Definitions of Simple Linear Regression Coefficients:

Suppose computation set $XY$ composes of $n$ pairs of data elements: $XY = \{(x_i, y_i) | i = 1, \ldots, n\}$, where data elements $x_1, x_2, x_3, x_4, \ldots, x_n$ are observed data from a predictor variable $X$ and data elements $y_1, y_2, y_3, y_4, \ldots, y_n$ are observed data from a response variable $Y$, simple linear regression coefficients for $XY$ need to be calculated.

Simple linear regression model is defined as $$Y = \beta 0 + \beta 1 X + \varepsilon$$

The relationship between Y and X can be described by a fitted regression line $\hat{Y} = b0 + b1X$. The estimates $b1$ and $b0$ are called simple linear regression coefficients and can be calculated using following equations:

$$b1 = \frac{\sum_1^n (x_i - \bar{x}_k)(y_i - \bar{y}_k)}{\sum_1^n (x_i - \bar{x}_k)^2} \qquad 401$$

$$b0 = \bar{y}_k - b1 \bar{x}_k \qquad 402$$

Define the sums of $X$ with size $n$ and $Y$ with size $n$ in the $k^{th}$ iteration respectively as below:

$$XS_k = x_1 + x_2 + x_3 + \cdots + x_n = \sum_1^n x_i \qquad 403$$

$$YS_k = y_1 + y_2 + y_3 + \cdots + y_n = \sum_1^n y_i \qquad 404$$

Define the means of $X$ with size $n$ and $Y$ with size $n$ respectively in the $k^{th}$ iteration as below:

$$\bar{x}_k = \frac{(x_1 + x_2 + x_3 + \cdots + x_n)}{n} = \frac{\sum_1^n x_i}{n} \qquad 405$$

$$\bar{y}_k = \frac{(y_1 + y_2 + y_3 + \cdots + y_n)}{n} = \frac{\sum_1^n y_i}{n} \qquad 406$$

The simple linear regression coefficients for $X$ with size $n$ and $Y$ with size $n$ in the $k^{th}$ iteration are defined as:

$$b1_k = \frac{\sum_1^n (x_i - \bar{x}_k)(y_i - \bar{y}_k)}{\sum_1^n (x_i - \bar{x}_k)^2} \qquad 407$$

$$b0_k = \bar{y}_k - b1_k \bar{x}_k \qquad 408$$

Fig. 4A

Suppose the simple linear regression coefficients of the computation set have already been calculated, and they need to be calculated again after a new pair of data elements $(x_a, y_a)$ being added to $XY$.

Define the sums and means of the adjusted $X$ with size $n + 1$ and $Y$ with size $n + 1$ respectively in the k+1$^{th}$ iteration as below:

$XS_{k+1} = x_1 + x_2 + x_3 + \cdots + x_n + x_a = \sum_1^n x_i + x_a$ ⟿ 409

$YS_{k+1} = y_1 + y_2 + y_3 + \cdots + y_n + y_a = \sum_1^n y_i + y_a$ ⟿ 410

$\bar{x}_{k+1} = \frac{(x_1+x_2+x_3+\cdots+x_n+x_a)}{n+1} = \frac{\sum_1^n x_i + x_a}{n+1}$ ⟿ 411

$\bar{y}_{k+1} = \frac{(y_1+y_2+y_3+\cdots+y_n+y_a)}{n+1} = \frac{\sum_1^n y_i + y_a}{n+1}$ ⟿ 412

The simple linear regression coefficients of the adjusted $X$ with size $n + 1$ and adjusted $Y$ with size $n + 1$ in the k+1$^{th}$ iteration are defined as:

$b1_{k+1} = \frac{\sum_1^n (x_i - \bar{x}_{k+1})(y_i - \bar{y}_{k+1}) + (x_a - \bar{x}_{k+1})(y_a - \bar{y}_{k+1})}{\sum_1^n (x_i - \bar{x}_{k+1})^2 + (x_a - \bar{x}_{k+1})^2}$ ⟿ 413

$b0_{k+1} = \bar{y}_{k+1} - b1_{k+1}\bar{x}_{k+1}$ ⟿ 414

Fig. 4A Cont'd

Some Example Components of Simple Linear Regression Coefficients:

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $XSS_k = \sum_1^n x_i^2$
- $XV_k = \sum_1^n x_i^2 - n\bar{x}_k^2 = XSS_k - \frac{XS_k^2}{n} = XSS_k - n\bar{x}_k^2$
- $SSDX_k = \sum_1^n (x_i - \frac{XS_k}{n})^2 = \sum_1^n (x_i - \bar{x}_k)^2$
- $SDXY_k = \sum_1^n (x_i - \bar{x}_k)(y_i - \bar{y}_k) = \sum_1^n (x_i - \frac{XS_k}{n})(y_i - \bar{y}_k) = \sum_1^n (x_i - \bar{x}_k)(y_i - \frac{YS_k}{n}) = \sum_1^n (x_i - \frac{XS_k}{n})(y_i - \frac{YS_k}{n})$
- $SXY_k = \sum_1^n x_i y_i$
- $x\sigma_k^2 = \frac{\sum_1^n x_i^2}{n} - \bar{x}_k^2 = \frac{\sum_1^n x_i^2}{n} - \left(\frac{XS_k}{n}\right)^2$
- $b1_k = \frac{\sum_1^n (x_i - \bar{x}_k)(y_i - \bar{y}_k)}{\sum_1^n (x_i - \bar{x}_k)^2} = \frac{\sum_1^n (x_i - \frac{XS_k}{n})(y_i - \bar{y}_k)}{\sum_1^n (x_i - \frac{XS_k}{n})^2} = \frac{\sum_1^n (x_i - \bar{x}_k)(y_i - \frac{YS_k}{n})}{\sum_1^n (x_i - \bar{x}_k)^2} = \frac{\sum_1^n (x_i - \frac{XS_k}{n})(y_i - \frac{YS_k}{n})}{\sum_1^n (x_i - \frac{XS_k}{n})^2}$
- $b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$ Basic Incremental Component Calculation Equations:

The sum and/or the mean of the independent variable X and the sum or mean of the dependent variable Y in computation set $XY$ will be used by several examples of incremental algorithms described in the following sections, so the equations for incremental calculation of sum or mean are put below instead of in each incremental algorithms.

According to the definitions of $XS_{k+1}$, $YS_{k+1}$, $\bar{x}_{k+1}$ and $\bar{y}_{k+1}$, they can be calculated in an incremental way:

$XS_{k+1} = XS_k + x_a$ ⟿ 415

$YS_{k+1} = YS_k + y_a$ ⟿ 416

$\bar{x}_{k+1} = \frac{XS_{k+1}}{n+1} = \frac{(n\bar{x}_k + x_a)}{n+1}$ ⟿ 417

$\bar{y}_{k+1} = \frac{YS_{k+1}}{n+1} = \frac{(n\bar{y}_k + y_a)}{n+1}$ ⟿ 418

Fig. 4B

Incremental Algorithm 1:

Simple linear regression coefficients can be incrementally calculated based on the components $XS_{k+1}$ or $\bar{x}_{k+1}$ and $YS_{k+1}$ or $\bar{y}_{k+1}$ defined in Figure 4A and Figure 4B and the components $SXY_{k+1}$, $XV_{k+1}$ defined below.

$XSS_k = \sum_1^n x_i^2$  ⌒⌣419

$XSS_{k+1} = \sum_1^n x_i^2 + x_a^2$  ⌒⌣420

$XSS_{k+1}$ can be calculated in an incremental way:

$XSS_{k+1} = XSS_k + x_a^2$  ⌒⌣421

$XV_k = XSS_k - \frac{XS_k^2}{n} = XSS_k - n\bar{x}_k^2$  ⌒⌣422

$XV_{k+1} = XSS_{k+1} - \frac{XS_{k+1}^2}{n+1} = XSS_{k+1} - (n+1)\bar{x}_{k+1}^2$  ⌒⌣423

$SXY_k = \sum_1^n x_i y_i$  ⌒⌣424

$SXY_{k+1} = \sum_1^n x_i y_i + x_a y_a$  ⌒⌣425

$SXY_{k+1}$ can be calculated in an incremental way:

$SXY_{k+1} = SXY_k + x_a y_a$  ⌒⌣426

Once $XS_{k+1}$ or $\bar{x}_{k+1}$, $YS_{k+1}$ or $\bar{y}_{k+1}$, $SXY_{k+1}$, $x\sigma_{k+1}$, and $y\sigma_{k+1}$ are calculated, then simple linear regression coefficients can be calculated by $b1_{k+1} = \frac{(SXY_{k+1} - YS_{k+1} XS_{k+1}/(n+1))}{XV_{k+1}} = \frac{(SXY_{k+1} - YS_{k+1}\bar{x}_{k+1})}{XV_{k+1}} = \frac{(SXY_{k+1} - \bar{y}_{k+1} XS_{k+1})}{XV_{k+1}} = \frac{(SXY_{k+1} - (n+1)\bar{y}_{k+1}\bar{x}_{k+1})}{XV_{k+1}}$

⌒⌣427

$b0_{k+1} = \frac{YS_{k+1}}{n+1} - b1_{k+1}\frac{XS_{k+1}}{n+1} = \frac{YS_{k+1}}{n+1} - b1_{k+1}\bar{x}_{k+1} = \bar{y}_{k+1} - b1_{k+1}\frac{XS_{k+1}}{n+1} = \bar{y}_{k+1} - b1_{k+1}\bar{x}_{k+1}$

Incremental Algorithm 2:

$SSDX_k = \sum_1^n (x_i - \bar{x}_k)^2$ ~429

$SSDX_{k+1} = \sum_1^n (x_i - \bar{x}_{k+1})^2 + (x_a - \bar{x}_{k+1})^2$ ~430

$SSDX_{k+1}$ can be calculated in an incremental way using $XS_k$ or $\bar{x}_k$ and $XS_{k+1}$ or $\bar{x}_{k+1}$:

$SSDX_{k+1} = SSDX_k + (x_a - XS_{k+1}/(n+1))(x_a - XS_k/n) = SSDX_k + (x_a - \bar{x}_{k+1})(x_a - \bar{x}_k)$ ~431

$SDXY_k = \sum_1^n (x_i - \bar{x}_k)(y_i - \bar{y}_k)$ ~432

$SDXY_{k+1} = \sum_1^n (x_i - \bar{x}_{k+1})(y_i - \bar{y}_{k+1}) + (x_a - \bar{x}_{k+1})(y_a - \bar{y}_{k+1})$ ~433

$SDXY_{k+1}$ can be calculated in an incremental way using $XS_k$ or $\bar{x}_k$ and $YS_k$ or $\bar{y}_k$:

$SDXY_{k+1} = SDXY_k + \frac{(n \cdot y_a - YS_k)(n \cdot x_a - XS_k)}{n(n+1)} = SDXY_k + \frac{(n \cdot y_a - YS_k)(x_a - \bar{x}_k)}{(n+1)} = SDXY_k + \frac{(y_a - \bar{y}_k)(n \cdot x_a - XS_k)}{(n+1)} = SDXY_k + \frac{n(y_a - \bar{y}_k)(x_a - \bar{x}_k)}{(n+1)}$ ~434

Once $SDXY_{k+1}$ is calculated, then $b1_{k+1} = \frac{SDXY_{k+1}}{SSDX_{k+1}}$ ~435

$b0_{k+1} = \frac{YS_{k+1}}{n+1} - b1_{k+1} \frac{XS_{k+1}}{n+1} = \frac{YS_{k+1}}{n+1} - b1_{k+1} \bar{x}_{k+1} = \bar{y}_{k+1} - b1_{k+1} \frac{XS_{k+1}}{n+1} = \bar{y}_{k+1} - b1_{k+1} \bar{x}_{k+1}$ ~436

Fig. 4D

Incremental Algorithm 3:

Simple linear regression coefficients can be calculated based on components $XS_{k+1}$ or $\bar{x}_{k+1}$ and $YS_{k+1}$ or $\bar{y}_{k+1}$ defined in Figure 4A and Figure 4B and $XSS_{k+1}$, $SXY_{k+1}$ defined below.

$XSS_k = \sum_1^n x_i^2$     437

$XSS_{k+1} = \sum_1^n x_i^2 + x_a^2$     438

$XSS_{k+1}$ can be calculated in an incremental way:

$XSS_{k+1} = XSS_k + x_a^2$     439

$SXY_k = \sum_1^n x_i y_i$     440

$SXY_{k+1} = \sum_1^n x_i y_i + x_a y_a$     441

$SXY_{k+1}$ can be calculated in an incremental way:

$SXY_{k+1} = SXY_k + x_a y_a$     442

Once components $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$ are calculated, then simple linear regression coefficients can be calculated by $$b1_{k+1} = \frac{(n+1)SXY_{k+1} - XS_{k+1}YS_{k+1}}{(n+1)XSS_{k+1} - XS_{k+1}^2} = \frac{SXY_{k+1} - XS_{k+1}\bar{y}_{k+1}}{XSS_{k+1} - XS_{k+1}^2/(n+1)} = \frac{SXY_{k+1} - \bar{x}_{k+1}YS_{k+1}}{XSS_{k+1} - (n+1)\bar{x}_{k+1}^2} = \frac{SXY_{k+1} - (n+1)\bar{x}_{k+1}\bar{y}_{k+1}}{XSS_{k+1} - (n+1)\bar{x}_{k+1}^2}$$

443

$$b0_{k+1} = \frac{YS_{k+1}}{n+1} - b1_{k+1}\frac{XS_{k+1}}{n+1} = \frac{YS_{k+1}}{n+1} - b1_{k+1}\bar{x}_{k+1} = \bar{y}_{k+1} - b1_{k+1}\frac{XS_{k+1}}{n+1} = \bar{y}_{k+1} - b1_{k+1}\bar{x}_{k+1}$$

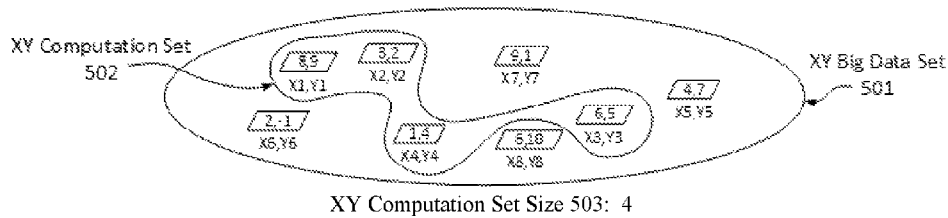

XY Computation Set Size 503: 4

Calculate Simple Linear Regression Coefficients for XY Computation Set 502

Traditional Algorithm:

1. Use equation 405 to calculate $\bar{x}_1$ and equation 406 to calculate $\bar{y}_1$ for the 1st iteration:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in the two steps: 2 divisions, 6 additions

2. Calculate $\sum_1^4 (x_i - \bar{x}_1)(y_i - \bar{y}_1)$ for the 1st iteration:

$\sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 22$ Operations in this step: 4 multiplications, 3 additions, 8 subtractions 3. Calculate $\sum_1^4 (x_i - \bar{x}_1)^2$ for the 1st iteration:

$\sum_1^4 (x_i - \bar{x}_1)^2 = (8 - 4.5)^2 + (3 - 4.5)^2 + (6 - 4.5)^2 + (1 - 4.5)^2 = 29$ Operations in this step: 4 multiplications, 3 additions, 4 subtractions 4. Use equation 407 to calculate $b1_1$ for the 1st iteration:

$$b1_1 = \frac{\sum_1^4 (x_i - \bar{x}_1)(y_i - \bar{y}_1)}{\sum_1^4 (x_i - \bar{x}_1)^2} = \frac{22}{29} = 0.7586206896551724$$

Operations in this step: 1 division

5. Use equation 408 to calculate $b0_1$ for the 1st iteration:

$b0_1 = \bar{y}_1 - b1_1 \bar{x}_1 = 5 - 0.7586206896551724 \times 4.5 = 5 - 3.4137931034482759 = 1.5862068965517241$ Operations in this step: 1 multiplication, 1 subtraction There are a total of 3 divisions, 9 multiplications, 12 additions and 13 subtractions.

Fig. 5A

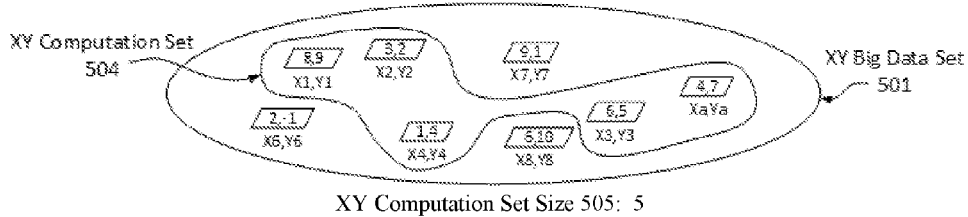

XY Computation Set Size 505: 5

Calculate Simple Linear Regression Coefficients for XY Computation Set 504

Traditional Algorithm:

1. Use equation 405 to calculate $\bar{x}_2$ and equation 406 to calculate $\bar{y}_2$ for the 2<sup>nd</sup> iteration:

$$\bar{x}_2 = \frac{8+3+6+1+4}{5} = 4.4 \qquad \bar{y}_2 = \frac{9+2+5+4+7}{5} = 5.4$$

Operations in the two steps: 2 divisions, 8 additions

2. Calculate $\sum_1^4(x_i - \bar{x}_2)(y_i - \bar{y}_2) + (x_a - \bar{x}_2)(y_a - \bar{y}_2)$ for the 2<sup>nd</sup> iteration:

$\sum_1^4(x_i - \bar{x}_2)(y_i - \bar{y}_2) + (x_a - \bar{x}_2)(y_a - \bar{y}_2) = (8 - 4.4)(9 - 5.4) + (3 - 4.4)(2 - 5.4) + (6 - 4.4)(5 - 5.4) + (1 - 4.4)(4 - 5.4) + (4 - 4.4)(7 - 5.4) = 21.2$ Operations in this step: 5 multiplications, 4 additions, 10 subtractions 3. Calculate $\sum_1^4(x_i - \bar{x}_2)^2 + (x_a - \bar{x}_2)^2$ for the 2<sup>nd</sup> iteration:

$\sum_1^4(x_i - \bar{x}_2)^2 + (x_a - \bar{x}_2)^2 = (8 - 4.4)^2 + (3 - 4.4)^2 + (6 - 4.4)^2 + (1 - 4.4)^2 + (4 - 4.4)^2 = 29.2$ Operations in this step: 5 multiplications, 4 additions, 5 subtractions 4. Use equation 407 to calculate $b1_2$ for the 2<sup>nd</sup> iteration:

$$b1_2 = \frac{\sum_1^4(x_i-\bar{x}_2)(y_i-\bar{y}_2)+(x_a-\bar{x}_2)(y_a-\bar{y}_2)}{\sum_1^4(x_i-\bar{x}_2)^2+(x_a-\bar{x}_2)^2} = \frac{21.2}{29.2} = 0.726027397260274$$

Operations in this step: 1 division

6. Use equation 408 to calculate $b0_2$ for the 2<sup>nd</sup> iteration:

$b0_2 = \bar{y}_2 - b1_2\bar{x}_2 = 5.4 - 0.726027397260274 \times 4.4 = 5.4 - 3.1945205479452056 = 2.2054794520547944$ Operations in this step: 1 multiplication, 1 subtraction There are a total of 3 divisions, 11 multiplications, 16 additions and 16 subtractions.

Fig. 5A Cont'd 1

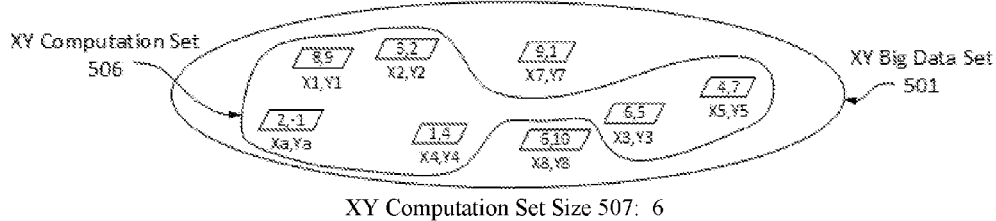

XY Computation Set Size 507: 6

Calculate Simple Linear Regression Coefficients for XY Computation Set 506

Traditional Algorithm:

1. Use equation 405 to calculate $\bar{x}_3$ and equation 406 to calculate $\bar{y}_3$ for the 3$^{rd}$ iteration:

$$\bar{x}_3 = \frac{8+3+6+1+4+2}{6} = 4 \qquad \bar{y}_3 = \frac{9+2+5+4+7+(-1)}{6} = 4.333333333333333$$

Operations in the two steps: 2 divisions, 10 additions

2. Calculate $\sum_1^5(x_i - \bar{x}_3)(y_i - \bar{y}_3) + (x_a - \bar{x}_3)(y_a - \bar{y}_3)$ for the 3$^{rd}$ iteration:

$$\sum_1^5(x_i - \bar{x}_3)(y_i - \bar{y}_3) + (x_a - \bar{x}_3)(y_a - \bar{y}_3) = 34$$

Operations in this step: 6 multiplications, 5 additions, 12 subtractions

3. Calculate $\sum_1^5(x_i - \bar{x}_3)^2 + (x_a - \bar{x}_3)^2$ for the 3$^{rd}$ iteration:

$$\sum_1^5(x_i - \bar{x}_3)^2 + (x_a - \bar{x}_3)^2 = (8-4)^2 + (3-4)^2 + (6-4)^2 + (1-4)^2 + (4-4)^2 + (2-4)^2 = 34$$

Operations in this step: 6 multiplications, 5 additions, 6 subtractions

4. Use equation 407 to calculate $b1_3$ for the 3$^{rd}$ iteration:

$$b1_3 = \frac{\sum_1^5(x_i - \bar{x}_3)(y_i - \bar{y}_3) + (x_a - \bar{x}_3)(y_a - \bar{y}_3)}{\sum_1^5(x_i - \bar{x}_3)^2 + (x_a - \bar{x}_3)^2} = \frac{34}{34} = 1.0$$

Operations in this step: 1 division

5. Use equation 408 to calculate $b0_3$ for the 3$^{rd}$ iteration:

$$b0_3 = \bar{y}_3 - b1_3\bar{x}_3 = 4.333333333333333 - 1.0 \times 4 = 0.333333333333333$$

Operations in this step: 1 multiplication, 1 subtraction

There are a total of 3 divisions, 13 multiplications, 20 additions and 19 subtractions.

Traditional algorithms typically take 3 divisions, 2$n$+1 multiplications, 4($n$-1) additions, and 3$n$+1 subtractions when calculating simple linear regression coefficients for a computation set composed of $n$ pairs of data elements without optimization.

Fig. 5A Cont'd 2

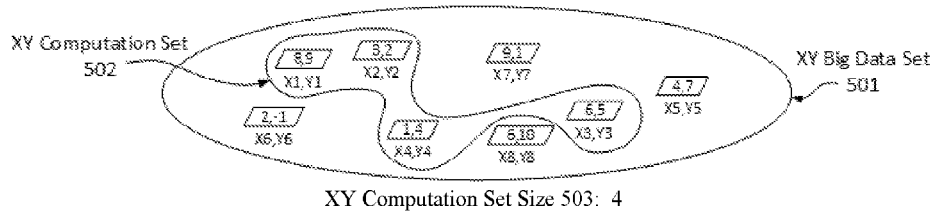

XY Computation Set Size 503: 4

Calculate Simple Linear Regression Coefficients for XY Computation Set 502

Incremental Algorithm 1:

1. Use equation 405 to calculate $\bar{x}_1$ and equation 406 to calculate $\bar{y}_1$ for the 1st iteration:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in the two steps: 2 divisions, 6 additions

2. Use equation 415 to calculate $XSS_1$ for the 1st iteration:

$$XSS_1 = \sum_1^n x_i^2 = 8^2 + 3^2 + 6^2 + 1^2 = 110$$

Operations in this step: 4 multiplications, 3 additions

3. Calculate $\sum_1^4 (x_i - \bar{x}_1)(y_i - \bar{y}_1)$ for the 1st iteration:

$$\sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 22$$

Operations in this step: 4 multiplications, 3 additions, 8 subtractions

4. Calculate $\sum_1^4 (x_i - \bar{x}_4)^2$ for the 1st iteration:

$$\sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

5. Use equation 425 to calculate $SXY_1$ for the 1st iteration:

$$SXY_1 = \sum_1^4 x_i y_i = 8 \times 9 + 3 \times 2 + 6 \times 5 + 1 \times 4 = 72 + 6 + 30 + 4 = 112$$

Operations in this step: 4 multiplications, 3 additions

6. Use equation 407 to calculate $b1_1$ and equation 408 to calculate $b0_1$ for the 1st iteration:

$$b1_1 = \frac{\sum_1^4 (x_i - \bar{x}_1)(y_i - \bar{y}_1)}{\sum_1^4 (x_i - \bar{x}_1)^2} = \frac{22}{29} = 0.7586206896551724$$

$$b0_1 = \bar{y}_1 - b1_1 \bar{x}_1 = 5 - 0.7586206896551724 \times 4.5 = 5 - 3.4137931034482759 = 1.5862068965517241$$

Operations in this step: 1 division, 1 multiplication, 1 subtraction

There are a total of 3 divisions, 17 multiplications, 18 additions and 13 subtractions.

Fig. 5B

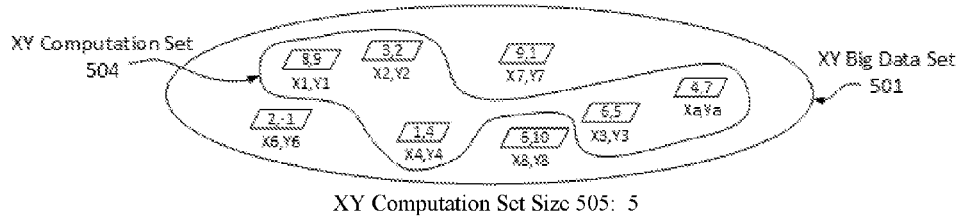

XY Computation Set Size 505: 5

<u>Calculate Simple Linear Regression Coefficients for XY Computation Set 504</u>

Incremental Algorithm 1:

1. Use equation 417 to calculate $\bar{x}_2$ and equation 418 to calculate $\bar{y}_2$ for the 2$^{nd}$ iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions (keep 4+1 value)

2. Use equation 421 to calculate $XSS_2$ for the 2$^{nd}$ iteration:

$$XSS_2 = XSS_1 + x_a^2 = 110 + 4^2 = 126$$

Operations in this step: 1 multiplication, 1 addition

3. Use equation 423 to calculate $XV_2$ for the 2$^{nd}$ iteration:

$$XV_2 = XSS_2 - (4+1)\bar{x}_2^2 = 126 - 5 \times 4.4^2 = 126 - 96.8 = 29.2$$

Operations in this step: 2 multiplications, 1 subtraction (use previous 4+1)

4. Use equation 426 to calculate $SXY_2$ for the 2$^{nd}$ iteration:

$$SXY_2 = SXY_1 + x_a y_a = 112 + 4 \times 7 = 112 + 28 = 140$$

Operations in this step: 1 multiplication, 1 addition

5. Use equations 427 and 428 to calculate $b1_2$ and $b0_2$ respectively for the 2$^{nd}$ iteration:

$$b1_2 = \frac{SXY_2 - 5\bar{x}_2\bar{y}_2}{XV_2} = \frac{140 - 5 \times 4.4 \times 5.4}{29.2} = \frac{21.2}{29.2} = 0.726027397260274$$

$$b0_2 = \bar{y}_2 - b1_2\bar{x}_2 = 5.4 - 0.726027397260274 \times 4.4 = 5.4 - 3.1945205479452056$$
$$= 2.2054794520547944$$

Operations in this step: 1 division, 3 multiplications, 2 subtractions (use 4+1 calculated in step 1)

There are a total of 3 divisions, 9 multiplications, 5 additions and 3 subtractions.

Fig. 5B Cont'd 1

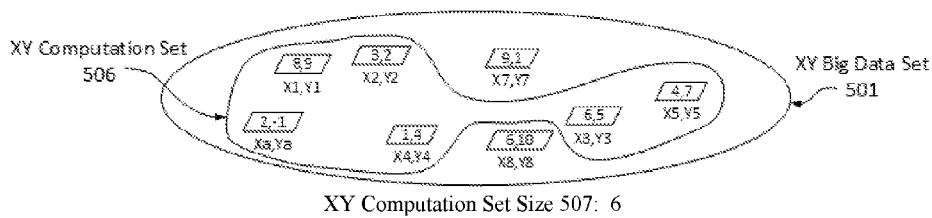

XY Computation Set Size 507: 6

<u>Calculate Simple Linear Regression Coefficients for XY Computation Set 506</u>

Incremental Algorithm 1:

1. Use equation 417 to calculate $\bar{x}_3$ and equation 418 to calculate $\bar{y}_3$ for the 3$^{rd}$ iteration:

$\bar{x}_3 = \frac{5\bar{x}_2 + x_a}{5+1} = \frac{5 \times 4.4 + 2}{6} = 4$  $\qquad \bar{y}_3 = \frac{5\bar{y}_2 + y_a}{5+1} = \frac{5 \times 5.4 + (-1)}{6} = 4.3333333333333333$ Operations in the two steps: 2 divisions, 2 multiplications, 3 additions (keep 5+1 value)

2. Use equation 421 to calculate $XSS_3$ for the 3$^{rd}$ iteration:

$XSS_3 = XSS_2 + x_a^2 = 126 + 2^2 = 130$

Operations in this step: 1 multiplication, 1 addition

3. Use equation 423 to calculate $XV_3$ for the 3$^{rd}$ iteration:

$XV_3 = XSS_3 - (5+1)\bar{x}_3^2 = 130 - 6 \times 4^2 = 130 - 96 = 34$

Operations in this step: 2 multiplications, 1 subtraction (use previous 5+1)

4. Use equation 426 to calculate $SXY_3$ for the 3$^{rd}$ iteration:

$SXY_3 = SXY_2 + x_a y_a = 140 + 2 \times (-1) = 138$

Operations in this step: 1 multiplication, 1 addition

5. Use equations 427 and 428 to incrementally calculate $b1_3$ and $b0_3$ respectively for the 3$^{rd}$ iteration:

$b1_3 = \frac{SXY_3 - 6\bar{x}_3\bar{y}_3}{XV_3} = \frac{138 - 6 \times 4 \times 4.3333333333333333}{34} = \frac{138 - 103.9999999999999992}{34} = 1.0$ $b0_3 = \bar{y}_3 - b1_3\bar{x}_3 = 4.333333333333333 - 1.0 \times 4 = 0.333333333333333$ Operations in this step: 1 division, 3 multiplications, 2 subtractions (use 5+1 calculated in step 1)

There are a total of 3 divisions, 9 multiplications, 5 additions and 3 subtractions.

Fig. 5B Cont'd 2

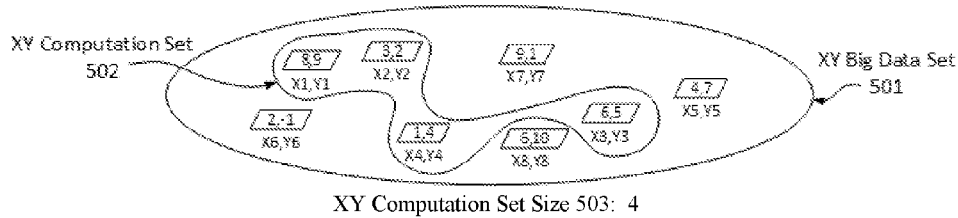

XY Computation Set Size 503: 4

Calculate Simple Linear Regression Coefficients for XY Computation Set 502

Incremental Algorithm 2:

1. Use equation 405 to calculate $\bar{x}_1$ and equation 406 to calculate $\bar{y}_1$ for the 1st iteration:

$$\bar{x}_1 = \frac{8+3+6+1}{4} = 4.5 \qquad \bar{y}_1 = \frac{9+2+5+4}{4} = 5$$

Operations in the two steps: 2 divisions, 6 additions

2. Use equation 429 to calculate $SSDX_1$ for the 1st iteration:

$$SSDX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Use equation 432 to calculate $SDXY_1$ for the 1st iteration:

$$SDXY_1 = \sum_1^4 (x_i - \bar{x}_1)(y_i - \bar{y}_1)$$
$$= (8 - 4.5)(9 - 5) + (3 - 4.5)(2 - 5) + (6 - 4.5)(5 - 5) + (1 - 4.5)(4 - 5) = 22$$

Operations in this step: 4 multiplications, 3 additions, 8 subtractions

4. Use equations 435 and 436 to calculate $b1_1$ and $b0_1$ respectively for the 1st iteration:

$$b1_1 = \frac{SDXY_1}{SSDX_1} = \frac{22}{29} = 0.75862068965517241$$

$$b0_1 = \bar{y}_1 - b1_1 \bar{x}_1 = 5 - 0.75862068965517241 \times 4.5 = 5 - 3.4137931034482759 = 1.5862068965517241$$

Operations in this step: 1 division, 1 multiplication, 1 subtraction

There are a total of 3 divisions, 9 multiplications, 12 additions and 13 subtractions.

Fig. 5C

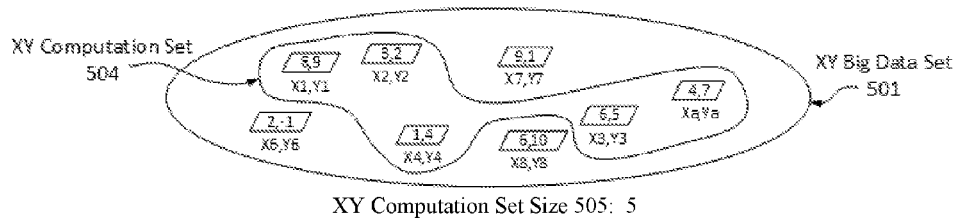

XY Computation Set Size 505: 5

Calculate Simple Linear Regression Coefficients for XY Computation Set 504

Incremental Algorithm 2:

1. Use equation 417 to calculate $\bar{x}_2$ and equation 418 to calculate $\bar{y}_2$ for the 2nd iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions (keep 4+1 value)

2. Use equation 431 to calculate $SSDX_2$ for the 2nd iteration:

$$SSDX_2 = SSDX_1 + (x_a - \bar{x}_2)(x_a - \bar{x}_1) = 29 + (4 - 4.4)(4 - 4.5) = 29.2$$

Operations in this step: 1 multiplication, 1 addition, 2 subtractions

3. Use equation 434 to calculate $SDXY_2$ for the 2nd iteration:

$$SDXY_2 = SDXY_1 + \frac{4(y_a - \bar{y}_1)(x_a - \bar{x}_1)}{(4+1)} = 22 + \frac{4(7-5)(4-4.5)}{5} = 21.2$$

Operations in this step: 2 multiplications, 1 addition, 2 subtractions (use 4+1 calculated in step 1)

4. Use equations 435 and 436 to calculate $b1_2$ and $b0_2$ respectively for the 2nd iteration:

$$b1_2 = \frac{SDXY_2}{SSDX_2} = \frac{21.2}{29.2} = 0.726027397260274$$

$$b0_2 = \bar{y}_2 - b1_2 \bar{x}_2 = 5.4 - 0.726027397260274 \times 4.4 = 5.4 - 3.1945205479452056 = 2.2054794520547944$$

Operations in this step: 1 division, 1 multiplication, 1 subtraction

There are a total of 3 divisions, 6 multiplications, 5 additions and 5 subtractions.

Fig. 5C Cont'd 1

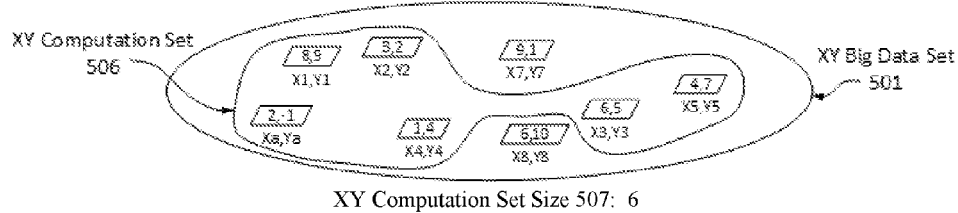

XY Computation Set Size 507: 6

<u>Calculate Simple Linear Regression Coefficients for XY Computation Set 506</u>

Incremental Algorithm 2:

1. Use equation 417 to calculate $\bar{x}_3$ and equation 418 to calculate $\bar{y}_3$ for the 3$^{rd}$ iteration:

$$\bar{x}_3 = \frac{5\bar{x}_2 + x_a}{5+1} = \frac{5 \times 4.4 + 2}{6} = 4 \qquad \bar{y}_3 = \frac{5\bar{y}_2 + y_a}{5+1} = \frac{5 \times 5.4 + (-1)}{6} = 4.3333333333333333$$

Operations in the two steps: 2 divisions, 2 multiplications, 3 additions (keep 5+1 value)

2. Use equation 431 to calculate $SSDX_3$ for the 3$^{rd}$ iteration:

$$SSDX_3 = SSDX_2 + (x_a - \bar{x}_3)(x_a - \bar{x}_2) = 29.2 + (2-4)(2-4.4) = 34$$

Operations in this step: 1 multiplication, 1 addition, 2 subtractions

3. Use equation 434 to calculate $SDXY_3$ for the 3$^{rd}$ iteration:

$$SDXY_3 = SDXY_2 + \frac{5(y_a - \bar{y}_2)(x_a - \bar{x}_2)}{(5+1)} = 21.2 + \frac{5((-1)-5.4)(2-4.4)}{6} = 34$$

Operations in this step: 1 division, 2 multiplications, 1 addition, 2 subtractions (use 5+1 calculated in step 1)

4. Use equations 435 and 436 to calculate $b1_3$ and $b0_3$ respectively for the 3$^{rd}$ iteration:

$$b1_3 = \frac{SDXY_3}{SSDX_3} = \frac{34}{34} = 1.0$$

$$b0_3 = \bar{y}_3 - b1_3\bar{x}_3 = 4.333333333333333 - 1.0 \times 4 = 0.333333333333333$$

Operations in this step: 1 division, 1 multiplication, 1 subtraction

There are a total of 3 divisions, 6 multiplications, 5 additions and 5 subtractions.

Fig. 5C Cont'd 2

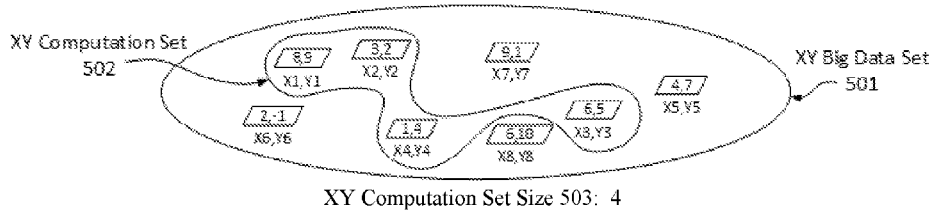

XY Computation Set Size 503: 4

Calculate Simple Linear Regression Coefficients for XY Computation Set 502

Incremental Algorithm 3:

1. Use equation 405 to calculate $\bar{x}_1$ and equation 406 to calculate $\bar{y}_1$ for the 1st iteration:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in the two steps: 2 divisions, 6 additions

2. Use equation 437 to calculate $XSS_1$ for the 1st iteration:

$$XSS_1 = \sum_1^4 x_i^2 = 8^2 + 3^2 + 6^2 + 1^2 = 110$$

Operations in this step: 4 multiplications, 3 additions

3. Use equation 440 to calculate $SXY_1$ for the 1st iteration:

$$SXY_1 = \sum_1^4 x_i y_i = 8 \times 9 + 3 \times 2 + 6 \times 5 + 1 \times 4 = 112$$

Operations in this step: 4 multiplications, 3 additions

4. Use equations 443 and 444 to calculate $b1_1$ and $b0_1$ respectively for the 1st iteration:

$$b1_1 = \frac{SXY_1 - 4\bar{x}_1\bar{y}_1}{XSS_1 - 4\bar{x}_1^2} = \frac{112 - 4 \times 4.5 \times 5}{110 - 4 \times 4.5^2} = \frac{112-90}{110-81} = \frac{22}{29} = 0.7586206896551724$$

$b0_1 = \bar{y}_1 - b1_1\bar{x}_1 = 5 - 0.7586206896551724 \times 4.5 = 5 - 3.4137931034482759 = 1.5862068965517241$ Operations in this step: 1 division, 5 multiplications, 2 subtractions There are a total of 3 divisions, 13 multiplications, 12 additions and 2 subtractions.

Fig. 5D

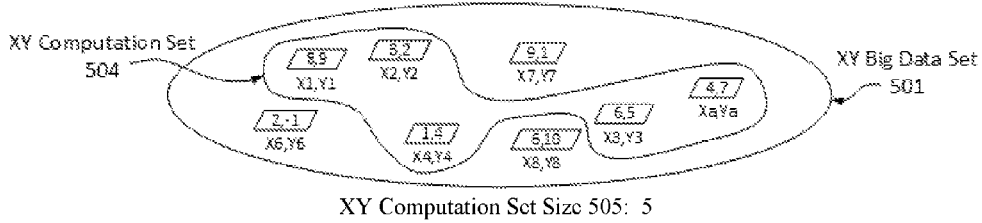

XY Computation Set Size 505: 5

Calculate Simple Linear Regression Coefficients for XY Computation Set 504

Incremental Algorithm 3:

1. Use equation 417 to calculate $\bar{x}_2$ and equation 418 to calculate $\bar{y}_2$ for the 2$^{nd}$ iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions (keep 4+1 value)

2. Use equation 439 to calculate $XSS_2$ for the 2$^{nd}$ iteration:

$$XSS_2 = XSS_1 + x_a^2 = 110 + 4^2 = 126$$

Operations in this step: 1 multiplication, 1 addition

3. Use equation 442 to calculate $SXY_2$ for the 2$^{nd}$ iteration:

$$SXY_2 = SXY_1 + x_a y_a = 112 + 4 \times 7 = 140$$

Operations in this step: 1 multiplication, 1 addition

4. Use equations 443 and 444 to calculate $b1_2$ and $b0_2$ respectively for the 2$^{nd}$ iteration:

$$b1_2 = \frac{SXY_2 - (4+1)\bar{x}_2\bar{y}_2}{XSS_2 - (4+1)\bar{x}_2^2} = \frac{140 - 5 \times 4.4 \times 5.4}{126 - 5 \times 4.4^2} = \frac{140 - 118.8}{126 - 96.8} = \frac{21.2}{29.2} = 0.726027397260274$$

$$b0_2 = \bar{y}_2 - b1_2\bar{x}_2 = 5.4 - 0.726027397260274 \times 4.4 = 5.4 - 3.1945205479452056 = 2.2054794520547944$$

Operations in this step: 1 division, 5 multiplications, 3 subtractions (use 4+1 calculated in step 1)

There are a total of 3 divisions, 9 multiplications, 5 additions and 3 subtractions.

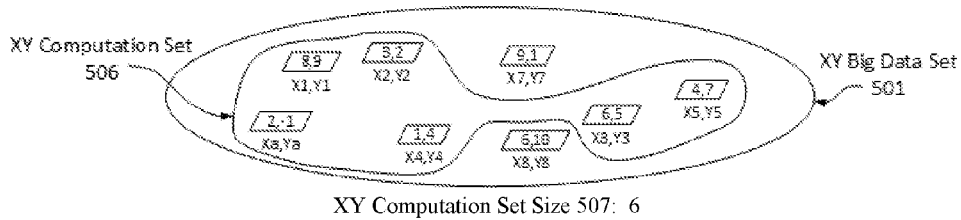

XY Computation Set Size 507: 6

Calculate Simple Linear Regression Coefficients for XY Computation Set 506

Incremental Algorithm 3:

1. Use equation 417 to calculate $\bar{x}_3$ and equation 418 to calculate $\bar{y}_3$ for the 3$^{rd}$ iteration:

$\bar{x}_3 = \frac{5\bar{x}_2 + x_a}{5+1} = \frac{5 \times 4.4 + 2}{6} = 4$     $\bar{y}_3 = \frac{5\bar{y}_2 + y_a}{5+1} = \frac{5 \times 5.4 + (-1)}{6} = 4.3333333333333333$ Operations in this step: 2 divisions, 2 multiplications, 3 additions (keep 5+1 value)

2. Use equation 439 to calculate $XSS_3$ for the 3$^{rd}$ iteration:

$XSS_3 = XSS_2 + x_a{}^2 = 126 + 2^2 = 130$

Operations in this step: 1 multiplication, 1 addition

3. Use equation 442 to calculate $SXY_3$ for the 3$^{rd}$ iteration:

$SXY_3 = SXY_2 + x_a y_a = 140 + 2 \times (-1) = 140 - 2 = 138$

Operations in this step: 1 multiplication, 1 addition

4. Use equations 443 and 444 to calculate $b1_3$ and $b0_3$ respectively for the 3$^{rd}$ iteration:

$b1_3 = \frac{SXY_3 - (5+1)\bar{x}_3\bar{y}_3}{XSS_3 - (5+1)\bar{x}_3{}^2} = \frac{138 - 6 \times 4 \times 4.3333333333333333}{130 - 6 \times 4^2} = \frac{138 - 103.9999999999999992}{130 - 96} = \frac{34.0000000000000008}{34} = 1.0$ $b0_3 = \bar{y}_3 - b1_3\bar{x}_3 = 4.333333333333333 - 1.0 \times 4 = 0.333333333333333$ Operations in this step: 1 division, 5 multiplications, 3 subtractions (use 5+1 calculated in step 1)

There are a total of 3 divisions, 9 multiplications, 5 additions and 3 subtractions.

Fig. 5D Cont'd 2

|  | Division | Multiplication | Addition | Subtraction |
|---|---|---|---|---|
| Traditional Algorithm | 3 | 13 | 20 | 19 |
| Incremental Algorithm 1 | 3 | 9 | 5 | 3 |
| Incremental Algorithm 2 | 3 | 6 | 5 | 5 |
| Incremental Algorithm 3 | 3 | 9 | 5 | 3 |

|  | Division | Multiplication | Addition | Subtraction |
|---|---|---|---|---|
| Traditional Algorithm | 3 | 2,000,001 | 3,999,996 | 3,000,001 |
| Incremental Algorithm 1 | 3 | 9 | 5 | 3 |
| Incremental Algorithm 2 | 3 | 6 | 5 | 5 |
| Incremental Algorithm 3 | 3 | 9 | 5 | 3 |

INCREMENTAL SIMPLE LINEAR REGRESSION COEFFICIENT CALCULATION FOR BIG DATA OR STREAMED DATA USING COMPONENTS

CROSS-REFERENCE TO RELATED APPLICATIONS

This application claims the benefit of provisional patent application Ser. No. 62/126,446, filed 2015 Feb. 28 by the present inventor.

BACKGROUND AND RELEVANT ART

Internet, mobile communications, navigation, online gaming, sensing technologies and large scale computing infrastructures have produced large amounts of data sets every day. Big Data is data beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require stream processing due to their nature, e.g., audio, video and digital TV, etc.

Processing streamed data may include performing calculations on multiple data elements. Thus, a computing device receiving a stream of data elements typically includes a buffer so that some number of data elements may be stored. Processing the streamed data elements may include accessing data elements stored in the buffer. When performing statistical calculations on streamed data elements, buffer requirements may be quite large. For example, when calculating simple linear regression coefficients a (potentially large) number of data elements may need to be accessed.

In addition, algorithms on streamed data processing may be extended to Big Data processing, because Big Data sets are accumulated over time and may be considered as data streams with irregular time intervals.

For Big data set or streamed data processing, some statistical calculations are recalculated as a Big Data set is changed or new streamed data elements are accessed or received. Thus, the (potentially large) number of data elements may be repeatedly accessed. For example, it may be that simple linear regression coefficients are calculated for a computation set and the computation set includes the last n pairs of data elements. When a new pair of data elements (one data element from an independent variable and the other from a dependent variable) is accessed or received, the new pair of data elements is added to the computation set. All 2n+2 data elements in the computation set are then accessed to re-calculate the simple linear regression coefficients.

When re-calculating simple linear regression coefficients on all 2n+2 data elements, all the 2n+2 data elements in the computation set will be visited and used. As such, each pair of data elements in the computation set needs to be accessed for recalculating the simple linear regression coefficients whenever there is a change in the computation set. Depending on necessity, the computation set size n may be extremely large, so the data elements in a computation set may be distributed over a cloud comprising hundreds of thousands of computing devices. Re-calculating simple linear regression coefficients in traditional way on Big Data or streamed data elements after some data changes inefficiently uses time and computing resources.

BRIEF SUMMARY

The present disclosure describes methods, systems, and computing device program products for incrementally calculating simple linear regression coefficients for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation subset size counter. The computation subset size counter indicates the number of pairs of data elements in a computation set of the one or two data sets or the one or two data streams. Embodiments of the invention include incrementally calculating one or more components of simple linear regression coefficients for a modified computation set based on one or more components calculated for the previous computation set and then calculating the simple linear regression coefficients based on the incrementally calculated components. Incrementally calculating simple linear regression coefficients not only avoids visiting all the data element in the computation set but also avoids storing the whole computation set as traditional algorithms would do, and thus improves the calculation efficiency, saves computing resources and reduces computing system's power consumption.

As used herein, a component of simple linear regression coefficients is a quantity or expression appearing in the simple linear regression coefficients' definition equations or any transforms of the equations. Simple linear regression coefficients may be calculated by using one or more components of the simple linear regression coefficients.

A computation set size counter and one or more components of simple linear regression coefficients need to be initialized before incremental calculation of the one or more components begins. The initialization of the computation set size counter comprises setting its value with the number of pairs of data elements in a computation set or accessing or receiving a specified computation set size. The initialization of the one or more components comprises calculating the one or more components through their definitions based on the data elements in the computation set or accessing or receiving pre-calculated one or more components from one or more computing-device-readable media.

The computing system initializes a computation set size counter n (n≥0) and v (1≤v≤p, p≥1) components of simple linear regression coefficients b1 and b0 for a computation set.

The computing system accesses or receives a pair of Big Data or streamed data elements to be added to the computation set.

The computing system stores the accessed or received pair of data elements into one or two data buffers as needed. Pure incremental simple linear regression coefficient calculation only needs access to the pair of data elements newly accessed or received but do not need access to data elements accessed or received earlier than the accessed or received pair of data elements, so the computing system does not necessarily allocate one or two storage spaces to keep all the data elements of the computation set but at least always keeps the computation set size counter and one or more components of simple linear regression coefficients for the computation set, and modifying the computation set may be reflected by modifying the computation set size counter and one or more components of simple linear regression coefficients for the computation set. However, since iterative simple linear regression coefficient calculation requires access to earlier accessed or received data elements, when combining incremental simple linear regression coefficient calculation with iterative simple linear regression coefficient calculation, the accessed or received pair of data elements needs to be stored into one or two data buffers for future usage. Thus, the computing system may optionally have one or two data buffers for storing the accessed or received data elements for the computation set.

The computing system modifies the computation set by adding the accessed or received pair of data elements to the computation set and modifies the computation set size counter by increasing its value by 1.

The computing system incrementally calculates one or more components of simple linear regression coefficients for the modified the computation set. The computing system calculates simple linear regression coefficients as needed based on one or more incrementally calculated components, i.e., simple linear regression coefficients may be calculated after multiple pairs of data elements are accessed or received instead of just one pair of data elements is accessed or received.

The computing system directly incrementally calculates v (1≤v≤p) components of simple linear regression coefficients for the modified computation set based on v components for the previous computation set. Directly incrementally calculating v components of simple linear regression coefficients includes directly incrementally calculating each of the v components one by one. Directly incrementally calculating a component of simple linear regression coefficients includes accessing the component calculated for the prior computation set. Directly incrementally calculating a component of simple linear regression coefficients includes adding a contribution of the added pair of data elements to the component mathematically.

The computing system indirectly incrementally calculates w=p−v components of simple linear regression coefficients for the modified computation set as needed. Indirectly incrementally calculating the w components includes indirectly incrementally calculating each of the w components one by one. Indirectly incrementally calculating a component includes calculating the component based on one or more components other than the component itself.

The computing system calculates simple linear regression coefficients as needed based on one or more incrementally calculated components of simple linear regression coefficients. The one or more components may have been initialized, directly incrementally calculated or indirectly incrementally calculated.

The computing system may keep accessing or receiving a pair of data elements to be added to the computation set, storing the accessed or received pair of data elements into one or two data buffers as needed, modifying the computation set and the computation set size counter, incrementally calculating one or more components and calculating simple linear regression coefficients as needed using one or more incrementally calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of simple linear regression coefficients and traditional equations for calculating simple linear regression coefficients on a computation set.

FIG. 4B illustrates some components of simple linear regression coefficients, which may be used for incrementally calculating simple linear regression coefficients on a computation set.

FIG. 4C illustrates the first example incremental simple linear regression coefficient calculation algorithm (incremental algorithm 1) and its equations for incrementally calculating simple linear regression coefficients based on incrementally calculated components $XS_{k+1}$ or $\bar{x}_{k+1}$, $YS_{k+1}$ or $\bar{y}_{k+1}$, $XV_{k+1}$, and $SXY_{k+1}$.

FIG. 4D illustrates the second example incremental simple linear regression coefficient calculation algorithm (incremental algorithm 2) and its equations for incrementally calculating simple linear regression coefficients based on incrementally calculated components $XS_{k+1}$ or $\bar{x}_{k+1}$, $YS_{k+1}$ or $\bar{y}_{k+1}$, $SSDX_{k+1}$, and $SDXY_{k+1}$.

FIG. 4E illustrates the third incremental simple linear regression coefficient calculation algorithm (incremental algorithm 3) and its equations for incrementally calculating simple linear regression coefficients in a computation set based on incrementally calculated components $XS_{k+1}$ or $\bar{x}_{k+1}$, $YS_{k+1}$ or $\bar{y}_{k+1}$, $XSS_{k+1}$, and $SXY_{k+1}$.

FIG. 5A illustrates an example of calculating simple linear regression coefficients using traditional algorithms as shown in FIG. 4A. This example uses a single input. Simple linear regression coefficient calculation with two inputs may be done in a similar way.

FIG. 5B illustrates an example of calculating simple linear regression coefficients using incremental algorithm 1) as shown in FIG. 4C.

FIG. 5C illustrates an example of calculating simple linear regression coefficients using incremental algorithm 2 as shown in FIG. 4D.

FIG. 5D illustrates an example of calculating simple linear regression coefficients using incremental algorithm 3 as shown in FIG. 4E.

FIG. 6 illustrates computational loads for traditional algorithms and incremental algorithms with a computation set of size 6.

FIG. 7 illustrates computational loads for traditional algorithms and incremental algorithms with a computation set of size 1,000,000.

DETAILED DESCRIPTION

Figure 1:
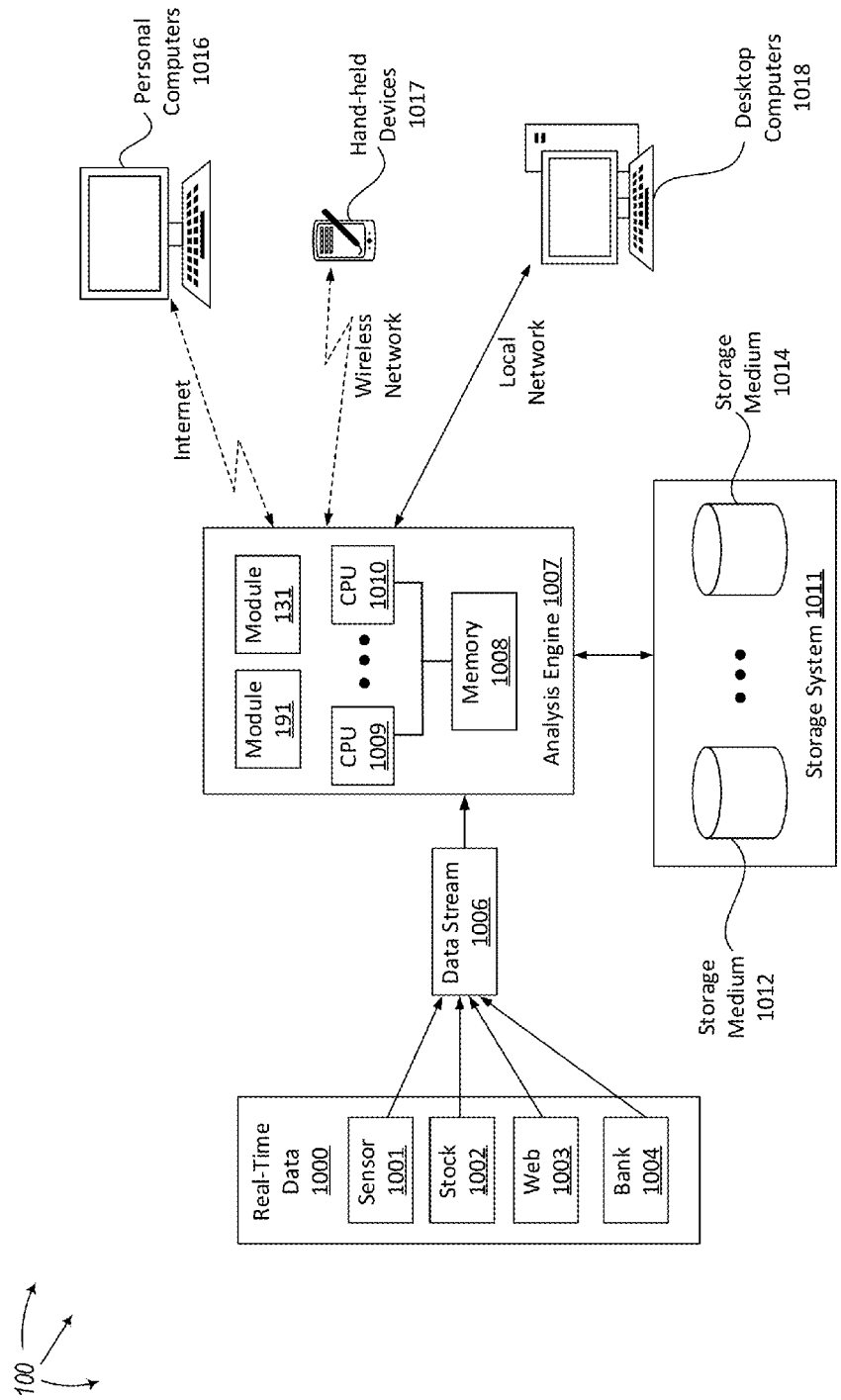
FIG. 1 illustrates a high-level overview of an example computing system that facilitates incrementally calculating simple linear regression coefficients for Big Data or streamed data.

The present disclosure describes methods, systems, and computing device program products for incrementally calculating simple linear regression coefficients for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation subset size counter. The computation subset size counter indicates the number of pairs of data elements in a computation set of the one or two data sets or the one or two data streams. Embodiments of the invention include incrementally calculating one or more components of simple linear regression coefficients for a modified computation set based on one or more components calculated for the previous computation set and then calculating the simple linear regression coefficients based on the incrementally calculated components. Incrementally calculating simple linear regression coefficients not only avoids visiting all the data element in the computation set but also avoids storing the whole computation set as traditional algorithms would do, and thus improves the calculation efficiency, saves computing resources and reduces computing system's power consumption.

Linear regression is an approach for modeling the relationship between a scalar dependent variable Y and one or more explanatory variables denoted X. The case of one explanatory variable is called simple linear regression. Simple linear regression has many practical uses. Most applications fall into one of the following two broad categories:

If the goal is prediction, forecasting, or reduction, simple linear regression may be used to fit a predictive model to an observed data set of Y and X values. After developing such a model, if an additional value of X is then given without its accompanying value of Y, the fitted model may be used to make a prediction of the value of Y.

Given a variable Y and a variable X that may be related to Y, simple linear regression analysis may be applied to quantify the strength of the relationship between Y and X.

A statistical model is a description of a state or process. Simple linear regression is for modeling the linear relationship between two variables. A simple linear regression model is often written as the following form $$Y=\beta 0+\beta 1X+\epsilon$$

Where Y is the dependent variable, β0 is the Y intercept, β1 is the gradient or the slope of the regression line, X is the independent variable, and ϵ is the error. It is usually assumed that error E is normally distributed with E(ϵ)=0 and a constant variance Var(ϵ)=σ² in the simple linear regression. Linear regression calculation involves estimating β1 and β0 based on observed values from X and Y. The least squares principle for the simple linear regression model is to find estimates b1 and b0 such that the sum of the squared distance from actual response $y_i$ and predicted response $\hat{y}_i=\beta 0+\beta 1 x_i$ reaches the minimum among all possible choices of regression coefficients β0 and β1. The relationship between Y and X may be described by a fitted regression line $\hat{Y}=b0+b1X$. The estimates b1 and b0 may be calculated using following equations:

$$b1 = \frac{\sum_{1}^{n}(x_i - \bar{x}_k)(y_i - \bar{y}_k)}{\sum_{1}^{n}(x_i - \bar{x}_k)^2}$$

$$b0 = \bar{y}_k - b1\bar{x}_k$$

The estimates b1 and b0 are called simple linear regression coefficients. Once b1 is calculated, b0 may be calculated.

As used herein, a computation set is a data set which contains data elements involved in simple linear regression coefficient calculation. A computation set is equivalent to a moving computation window when calculating simple linear regression coefficients on streamed data or time series data. Within the description of embodiments of the present invention, the difference between a computation window and a computation set is that data elements in a computation window are ordered but that in a computation set are not.

Simple linear regression coefficient calculation works on two variables, however data elements involved in simple linear regression coefficient calculation should be calculated in pairs (i.e., the coordinates of a point in a 2-D space), thus the data elements from two variables are grouped into pairs and put into a single computation set. The computation set may be either input and stored separately or input and stored in a combined interleaved manner. For the former case, there will be two Big Data sets or input streams and each Big Data set or input stream contains the data elements of one variable respectively, and there will be two buffers with each buffer storing the data elements of one variable respectively. For the latter case, there will be a single Big Data set or input stream and the Big Data set or input stream contains multiple data pairs with each data pair containing one data element from each variable.

As used herein, a component is a quantity or expression appearing in simple linear regression's coefficients definition equations or any transforms of the definition equations. A simple linear regression coefficient is the largest component of a simple linear regression coefficient itself. Simple linear regression coefficients may be calculated based on one or more components. Some example components of simple linear regression coefficients may be found in FIG. 4B.

A component may be either directly incrementally calculated or indirectly incrementally calculated. The difference is that when directly incrementally calculating a component, the component is calculated based on the component's value in previous iteration but when indirectly incrementally calculating a component, the component is calculated based on one or more components other than the component itself. The one or more components may have been initialized, directly incrementally calculated or indirectly incrementally calculated.

For a given component, it might be directly incrementally calculated in one algorithm but indirectly incrementally calculated in another algorithm.

For a given algorithm, assume the total number of different components is p (p≥1), the number of directly calculated components is v (1≤v≤p), then the number of indirectly incrementally calculated components is w=p−v (0≤w≤p). For any algorithm, there will be at least one component being directly incrementally calculated. It is possible that all components are directly incrementally calculated (in this case v=p and w=0). However, directly incrementally calculated components must be calculated in every iteration no matter if simple linear regression coefficients are accessed or not in a specific iteration.

Simple linear regression coefficients may be calculated on a need basis. When simple linear regression coefficients are not accessed for every data change in the computation set, the computing system may just incrementally calculate one or more components for each data change only. Simple linear regression coefficients may be calculated based on the one or more components and returned whenever it is accessed.

For a given algorithm, if a component is directly incrementally calculated, then the component must be calculated in every iteration (i.e., whenever a pair of data elements is added to the computation set). However, if a component is indirectly incrementally calculated, then the component may be calculated as needed, i.e., when simple linear regression coefficients need to be calculated and accessed. So, when simple linear regression coefficients are not accessed in a specific iteration, only a small number of components are incrementally calculated to save computation time. This may be useful when simple linear regression coefficients need to be calculated after multiple pairs of data elements (e.g., two arrays of data elements instead of a pair of data elements) have been added to the computation set. Embodiments of the present invention may be extended to handle the above case by adding a loop to loop over two arrays of data elements pair by pair, and within the loop directly incrementally calculating one or more components, and after the loop either indirectly incrementally calculating one or more components or directly calculating simple linear regression coefficients. Understanding that an indirectly incrementally calculated component may also be used in the calculation of a directly incrementally calculated component. In that case, the indirectly incrementally calculated component should also be calculated in every iteration.

Embodiments of the invention include incrementally calculating one or more components of simple linear regression coefficients in the modified computation set based on one or more components calculated for the previous computation set.

The computing system incrementally calculates one or more components of simple linear regression coefficients starting from either an empty computation set or a non-empty computation set where one or more components may have already been calculated.

When the computing system incrementally calculates one or more components of simple linear regression coefficients starting from an empty computation set, the computation set size counter is initialized with a zero and one or more components are initialized with zero values.

When incremental simple linear regression coefficient calculation starting from a non-empty computation set, the computation set size counter is initialized with the number of pairs of data elements contained in the computation set, and one or more components are initialized through their definitions based on the data elements in the computation set or by iterative simple linear regression coefficient calculation (presented in a separate patent application) or by decremental simple linear regression coefficient calculation (presented in a separate patent application).

The computing system accesses or receives a pair of data elements to be added to the computation set.

The computing system stores the accessed or received pair of data elements into one or two data buffers as needed. Pure incremental simple linear regression coefficient calculation only needs access to the pair of data elements newly accessed or received but do not need access to data elements accessed or received earlier than the newly accessed or received pair of data elements, so the computing system does not necessarily allocate one or two storage spaces to keep all the data elements of the computation set but at least always keeps the computation set size counter and one or more components of simple linear regression coefficients for the computation set, and modifying the computation set may be reflected by modifying the computation set size counter and one or more components of simple linear regression coefficients for the computation set. However, since iterative simple linear regression coefficient calculation requires access to earlier accessed or received pairs of data elements, when combining incremental simple linear regression coefficient calculation with iterative simple linear regression coefficient calculation, the accessed or received pair of data elements may need to be stored into one or two data buffers for future usage. Thus, the computing system may optionally have one or two data buffers for storing the accessed or received pair of data elements for the computation set.

The computing system modifies the computation set by adding the accessed or received pair of data elements to the computation set. The computing system modifies the computation set size counter by adding its value by 1.

The computing system incrementally calculating one or more components of simple linear regression coefficients for the modified computation set includes directly incrementally calculating v ($1 \leq v \leq p$) components of simple linear regression coefficients for the modified computation set based on v components for the prior computation set. Directly incrementally calculating v components includes directly incrementally calculating each of the v components one by one. Directly incrementally calculating a component includes accessing the component calculated for the prior computation set. Directly incrementally calculating a component includes adding a contribution of the added pair of data elements to the component mathematically. For example, incrementally calculating v components includes directly incrementally calculating a sum or a mean for each variable in the computation set respectively. Directly incrementally calculating the sum or the mean includes and accessing the sum or the mean calculated for each variable in prior computation set. Directly incrementally calculating the sum or the mean includes adding a contribution of the added pair of data elements to the sum or the mean mathematically.

The computing system incrementally calculating one or more components of simple linear regression coefficients for the modified computation set includes indirectly incrementally calculating w=p−v components as needed. Indirectly incrementally calculating the w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

The computing system calculates simple linear regression coefficients as needed based on one or more incrementally calculated components.

The computing system may keep accessing or receiving a pair of data elements to be added to the computation set, storing the accessed or received pair of data elements into one or two data buffers as needed, modifying the computation set and the computation set size counter, incrementally calculating one or more components and calculating simple linear regression coefficients as needed based on the one or more incrementally calculated components, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired and wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computingdevice-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then transferred to computing device RAM and/or to a less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates incrementally calculating simple linear regression coefficients for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, simple linear regression coefficient calculation module 191 and component calculation modules 131. Simple linear regression coefficient calculation module 191 component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Data from different data sources may also be stored in storage system 1011 which may be accessed for Big Data analysis. Understanding that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
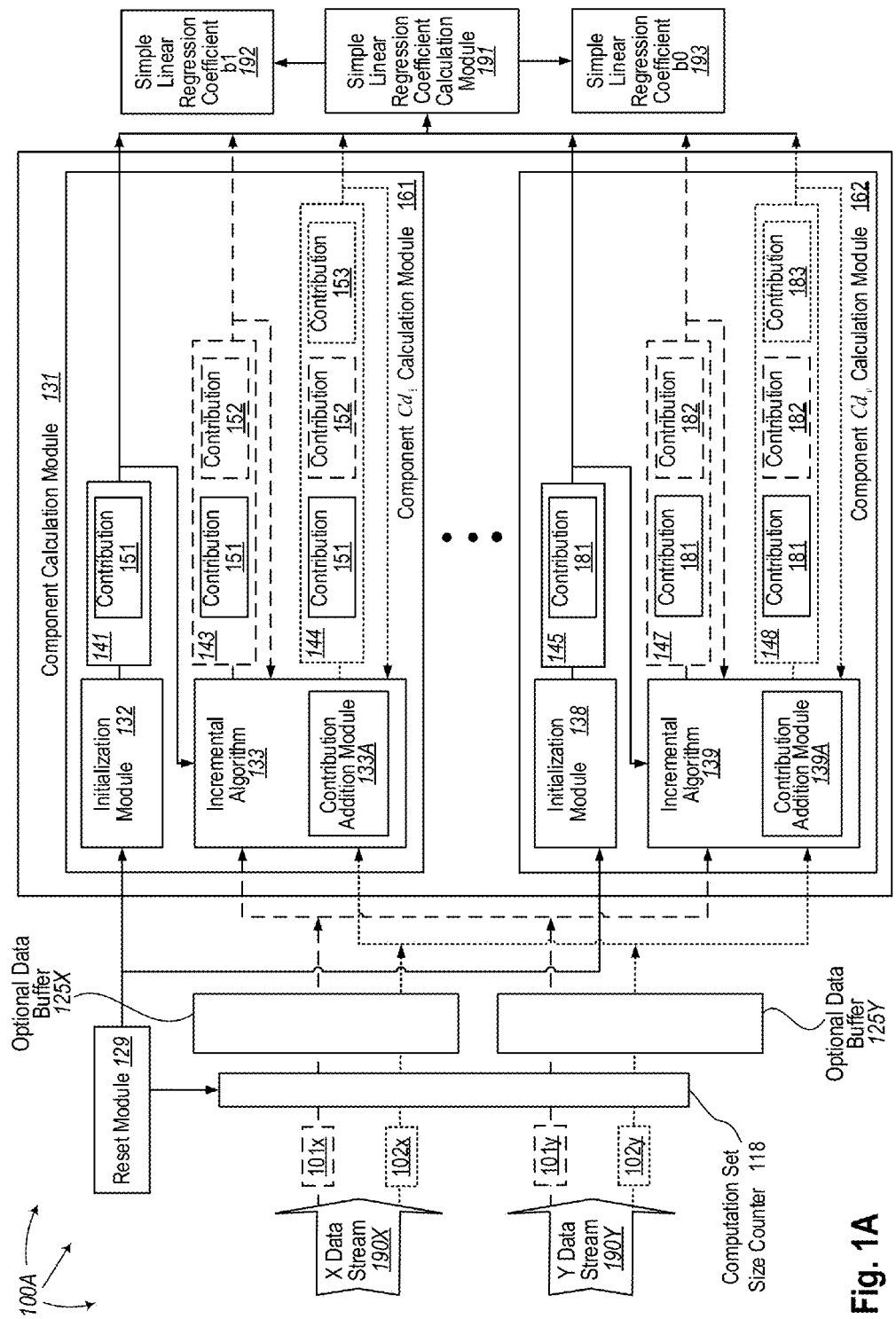
FIG. 1A illustrates an example computing device architecture that facilitates incrementally calculating simple linear regression coefficients for Big Data or streamed data with two inputs with all components being directly incrementally calculated.

FIG. 1A illustrates an example computing device architecture 100A that facilitates incrementally calculating simple linear regression coefficients for streamed data. FIG. 1A illustrates 1007 and 1006 shown in FIG. 1. Referring to FIG. 1A, computing device architecture 100A includes incremental component calculation module 131, simple linear regression coefficient calculation module 191 and simple linear regression coefficients b1 192 and b0 193. Incremental component calculation module 131 may be connected to (or is part of) a network, such as, for example, a Local Area Network ("LAN"), a Wide Area Network ("WAN"), and even the Internet. Accordingly, incremental component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of simple linear regression coefficient calculation module 191, and simple linear regression coefficient calculation module 191 will generate simple linear regression coefficients b1 192 and b0 193.

In general, data stream 190X and data stream 190Y may be a sequence of digitally encoded signals (e.g., packets of data or data packets) respectively used to transmit or receive information that is in the process of being transmitted. Data stream 190X and data stream 190Y may stream data elements to computing device architecture 100A. Data stream 190X and data stream 190Y may stream stored data or be a live stream.

Computation set size counter 118 may be implemented in hardware or software. When it is implemented in hardware, counter 118 may be a small device that may update a computation set size stored in a location in counter 118. When it is implemented in software, counter 118 may be just a variable stored in RAM, hard drive or any other computing-device-readable storage media, and the content of counter 118 is a computation set size. Computation set size counter 118 may be used to keep track the size of a computation set. Whenever receiving a pair of data elements, the computing device adjusts the computation set by adding the pair of data elements to the computation set and adjusts the computation set size counter 118 by increasing its content or value by 1. Computation set size counter 118 may be accessed or received by component calculation module 131, and it may be reset to 0 when incremental simple linear regression coefficient calculation is reset or set to a specific value by reset module 129 when incremental simple linear regression coefficient calculation starts working on a non-empty computation set. Within the description of this disclosure, a computation set size counter is equivalent to a computation set size and may be used interchangeably.

For example, as depicted in FIG. 1A, when a pair of data elements ($101x, 101y$) is received, the counter 118 will be increased by 1. Both the computation set size counter 118 and the pair of data elements ($101x, 101y$) may be accessed or received by component calculation module 131.

Subsequently, a pair of data elements ($102x, 102y$) may be received. When this happens, the computation set counter 118 will increase its value by 1. Both the modified computation set size counter 118 and the pair of data elements ($102x, 102y$) may be accessed or received by component calculation module 131.

Computing device architecture 100A may comprise an optional data buffer 125X for storing input data elements from X data stream 190X and an optional data buffer 125Y for storing input data elements from Y data stream 190Y. Incremental simple linear regression coefficient calculation algorithms do not require access to any data elements accessed or received earlier, therefore it is not necessary to store the accessed or received data elements for pure incremental simple linear regression coefficient calculation. However, when combining incremental simple linear regression coefficient calculation with iterative simple linear regression coefficient calculation, the accessed or received pair of data elements may need to be stored for future usage, and therefore computing device architecture 100A will have two data buffers 125X and 125Y in this case, so data buffers 125X and 125Y are optional.

Referring to computing device architecture 100A, incremental component calculation module 131 comprises v ($v=p\geq1$) component calculation modules for calculating v components for data elements in a computation set. The number v varies depending on the incremental algorithm chosen. As depicted in FIG. 1A, component calculation module 131 comprises calculation module 161 and component $Cd_v$ calculation module 162, and there are v−2 other component calculation modules between them. Calculation module 161 comprises initialization module 132 for initializing component $Cd_1$ and incremental algorithm 133 for incrementally calculating component $Cd_1$. Calculation module 162 comprises initialization module 138 for initializing component $Cd_v$ and incremental algorithm 139 for incrementally calculating component $Cd_v$. Initialization module 132 is configured to initialize component $Cd_1$ for data elements in the computation set and initialization module 138 is configured to initialize component $Cd_v$ for data elements in the computation set. Component $Cd_1$ 141 is the initial value of component $Cd_1$. Initialization module 132 may be used for an initialization of component $Cd_1$ or when simple linear regression coefficient calculations are reset. Initialization module 132 either initialize component $Cd_1$ 141 to be zero if the computation set is empty (the computation set size counter is zero) or a specific value contribution 151 passed in by reset module 129 if the computation set is non-empty. Similarly, initialization module 138 may be used for an initialization of component $Cd_v$ or when simple linear regression coefficient calculations are reset. Component $Cd_v$ 145 is the initial value of component $Cd_v$. Initialization module 138 either initialize component $Cd_v$ 145 to be zero if the computation set is empty (the computation set size counter is zero) or a specific value contribution 181 passed in by reset module 129 if the computation set is non-empty.

Incremental algorithms are also configured to calculate v components for data elements in the computation set. Incremental algorithm 133 accesses or receives a prior component $Cd_1$ value and an added pair of data elements as input. Incremental algorithm 133 directly incrementally calculates a component $Cd_1$ for the modified computation set based on the prior component $Cd_1$ value and the added pair of data elements. Contribution addition module 133A may add a contribution for the added pair of data elements to the prior component $Cd_1$. Adding a contribution for the added pair of data elements may be used to calculate component $Cd_1$ for the modified computation set. Incremental algorithm 139 works in a similar way as incremental algorithm 133. Incremental algorithm 139 accesses or receives a prior component $Cd_v$ value and an added pair of data elements from the computation set as input. Incremental algorithm 139 directly incrementally calculates a component $Cd_v$ for the modified computation set based on the prior component $Cd_v$ value and the added pair of data elements. Contribution addition module 139A may add a contribution for the added pair of data elements to the prior component $Cd_v$. Adding a contribution for the added pair of data elements may be used to calculate component $Cd_v$ for the modified computation set.

Referring to FIG. 1A, computing device architecture 100A also includes simple linear regression coefficient calculation module 191 and simple linear regression coefficients b1 192 and b0 193. Once p (p≥1) components of simple linear regression coefficients are incrementally calculated by component calculation module 131, calculation module 191 may calculate simple linear regression coefficients b1 192 and b0 193 using one or more incrementally calculated or initialized components.

Figure 1B:
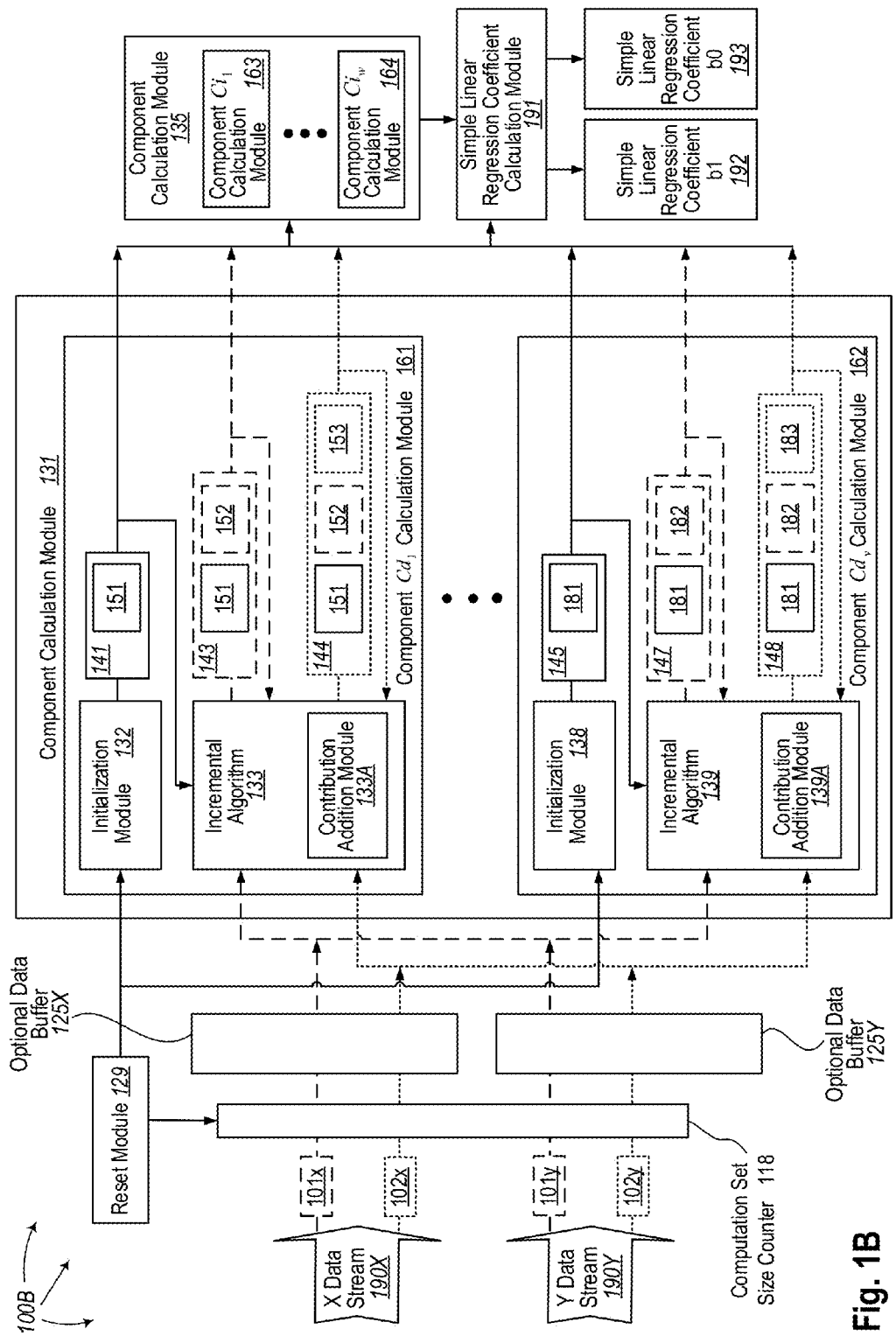
FIG. 1B illustrates an example computing device architecture that facilitates incrementally calculating simple linear regression coefficients for Big Data or streamed data with two inputs with some components being directly incrementally calculated and some components being indirectly incrementally calculated.

FIG. 1B illustrates an example computing device architecture 100B that facilitates incrementally calculating simple linear regression coefficients for Big Data or streamed data with two inputs with some (v (1≤v<p)) components being directly incrementally calculated and some (w (w=p−v)) components being indirectly incrementally calculated. Number v as well as number w is algorithm dependent. In certain implementations, the difference between computing device architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Number v in 100B may not be the same number v as in 100A, because some directly incrementally calculated components in 100A are indirectly incrementally calculated in 100B. In 100A, v=p≥1, but in 100B, 1≤v≤p. Referring to FIG. 1B, computing device architecture 100B includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficients b1 192 and b0 193. Component calculation module 135 generally includes w=p−v component calculation modules for indirectly incrementally calculating w components. For example, component calculation module 135 includes calculation module 163 for indirectly incrementally calculating component $Ci_1$ and calculation module 164 for indirectly incrementally calculating component $Ci_w$, and there are w−2 component calculation modules between them. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing device architecture 100B, once all p (p=v+w) components have been incrementally calculated, calculation module 191 may be used for calculating simple linear regression coefficients b1 192 and b0 193 as needed based on one or more incrementally calculated or initialized components.

Figure 1C:
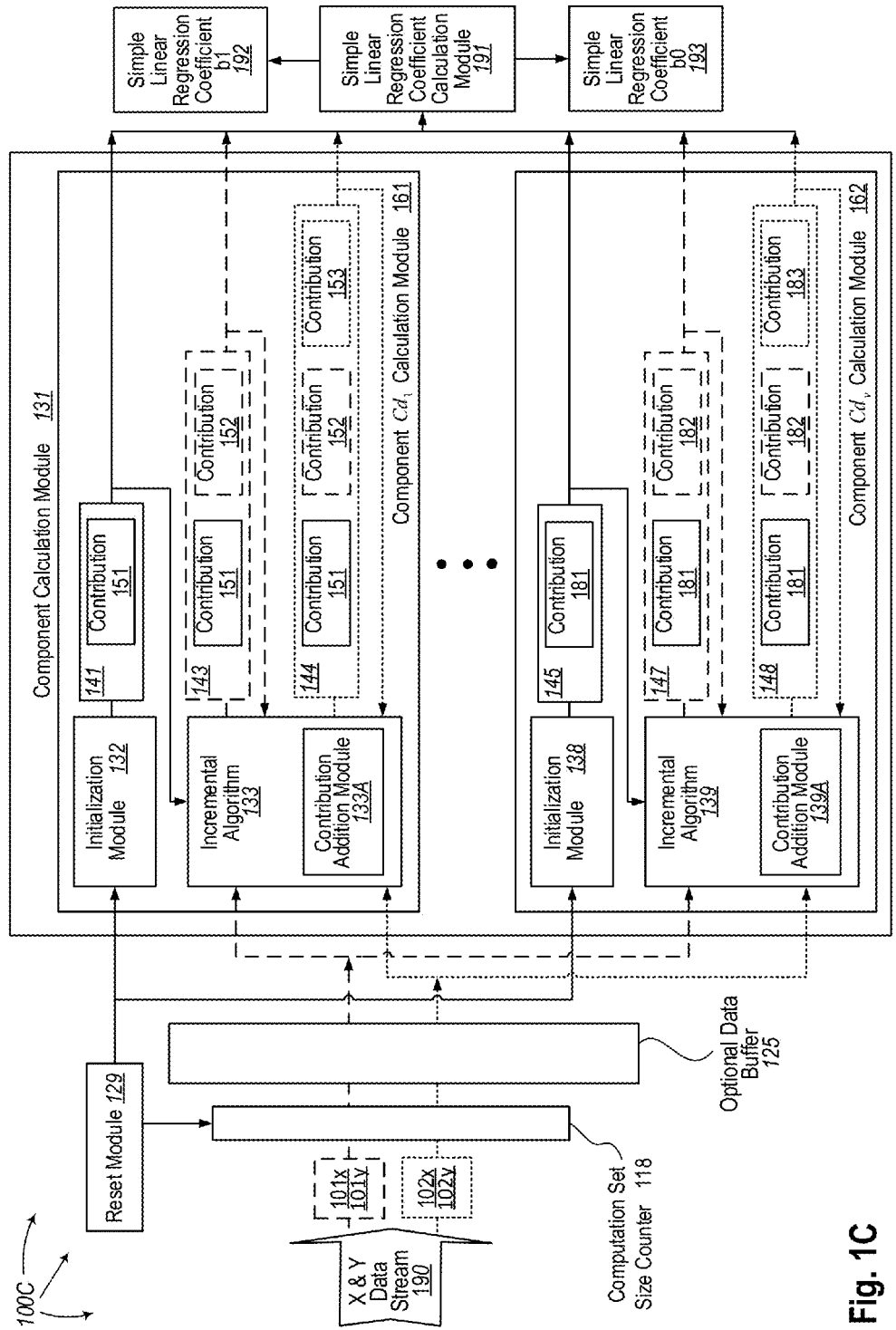
FIG. 1C illustrates an example computing device architecture that facilitates incrementally calculating simple linear regression coefficients for Big Data or streamed data with a single input where data elements from two Big Data sets or two data streams are interleaved with all components being directly incrementally calculated.

FIG. 1C illustrates an example computing device architecture 100C that facilitates incrementally calculating simple linear regression coefficients for Big Data or streamed data with a single input where data elements from two Big Data sets or two data streams are interleaved with all (v=p≥1) components being directly incrementally calculated. The difference between computing device architectures 100C and 100A is that architecture 100C uses a single stream as input where two sets of data elements are interleaved and 100C uses a single circular buffer for storing data elements in the computation set. All parts except the input mode in 100C work in a similar way as those parts with the same reference numbers in 100A. Instead of repeating what have already been explained in the description about 100A, only the different part is discussed here. Referring to FIG. 1C, data stream 190 comprises two interleaved data streams X and Y. As pairs of streamed data elements are accessed or received, the streamed data elements may be placed in a location within an optional data buffer 125 (when combining incremental simple linear regression coefficient calculation with iterative simple linear regression coefficient calculation).

Referring to FIG. 1C, computing device architecture 100C also includes calculation module 191 and simple linear regression coefficients b1 192 and b0 193. Once all p (p=v≥1) components of simple linear regression coefficients are incrementally calculated by component calculation module 131, calculation module 191 may calculate simple linear regression coefficients b1 192 and b0 193 as needed using one or more incrementally calculated or initialized components.

Figure 1D:
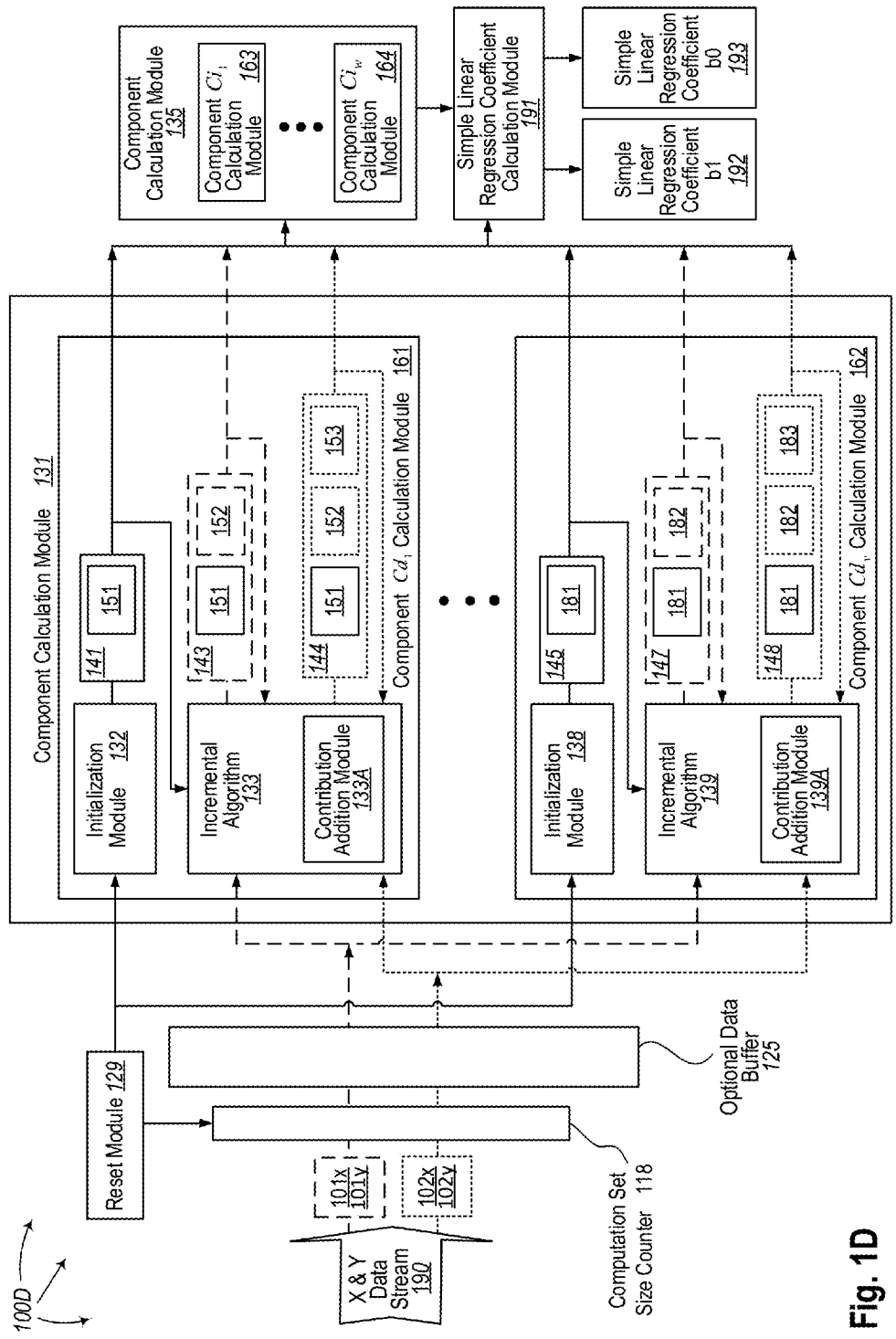
FIG. 1D illustrates an example computing device architecture that facilitates incrementally calculating simple linear regression coefficients for Big Data or streamed data with a single input where data elements from two Big Data sets or two data streams are interleaved with some components being directly incrementally calculated and some components being indirectly incrementally calculated.

FIG. 1D illustrates an example computing device architecture 100D that facilitates incrementally calculating simple linear regression coefficients for Big Data or streamed data with a single input where data elements from two Big Data sets or two data streams are interleaved with some (v (1≤v<p)) components being directly incrementally calculated and some (w (w=p−v)) components being indirectly incrementally calculated. The difference between computing device architectures 100D and 100C may be that architecture 100D includes a component calculation module 135. All parts except component calculation module 135 in 100D work in a similar way as those parts with the same reference numbers in 100A and 100C. Instead of repeating what have already been explained in the descriptions about 100A and 100C respectively, only the different part is discussed here. Number v in 100D may not be the same number v as in 100C, because some directly incrementally calculated components in 100C are indirectly incrementally calculated in 100D. In 100C, v=p≥1, but in 100D, 1≤v<p. Referring to FIG. 1D, computing device architecture 100D includes component calculation module 135. Component calculation module 135 includes w=p−v component calculation modules for indirectly incrementally calculating w components. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing device architecture 100D, once all p (p=v+w) components have been incrementally calculated, calculation module 191 may be used for calculating simple linear regression coefficients b1 192 and b0 193 as needed based on one or more incrementally calculated or initialized components.

Figure 1E:
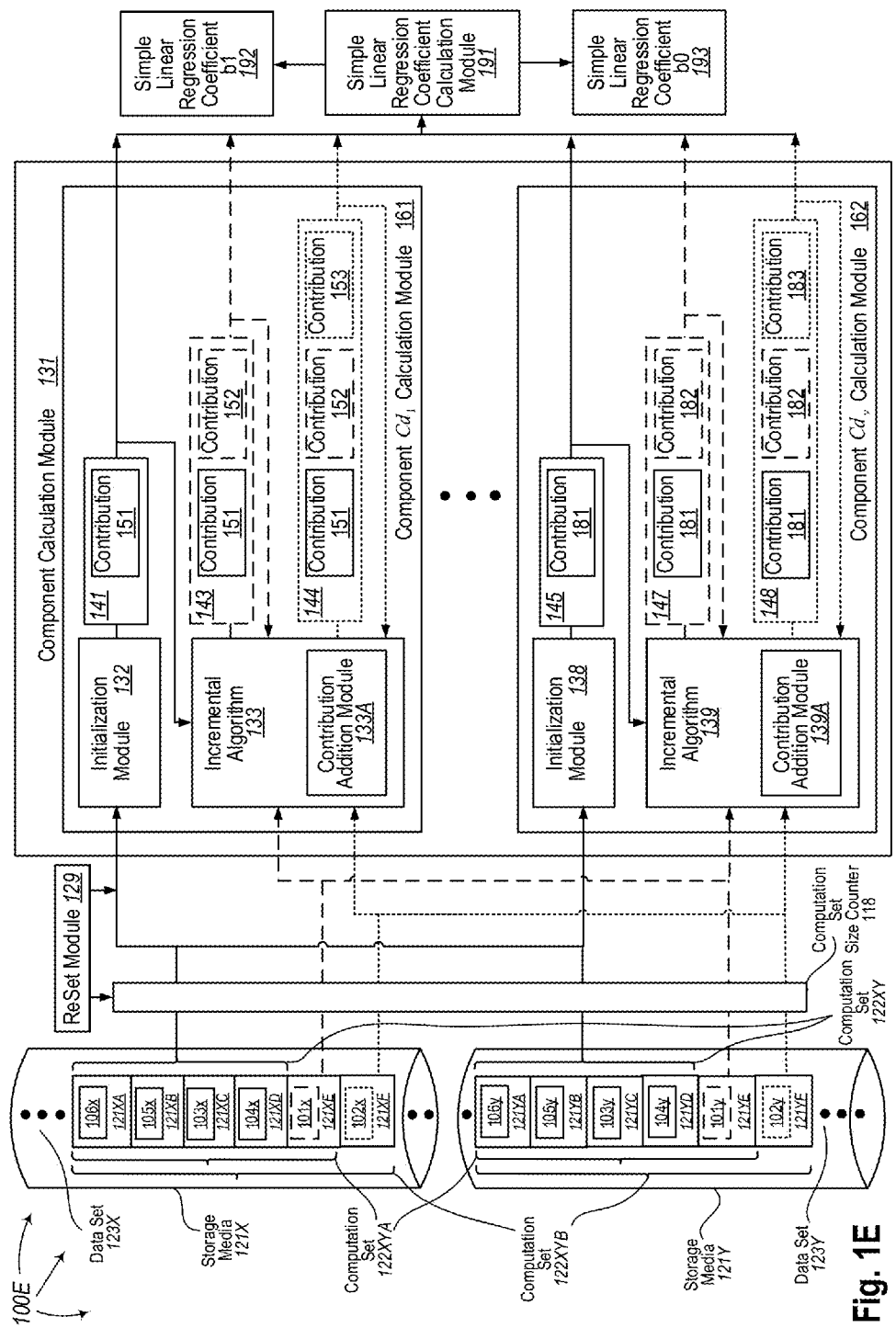
FIG. 1E illustrates an example computing device architecture that facilitates incrementally calculating simple linear regression coefficients for Big Data with two inputs with all components being directly incrementally calculated.

FIG. 1E illustrates an example computing device architecture 100E that facilitates incrementally calculating simple linear regression coefficients for Big Data. Referring to FIG. 1E, computing device architecture 100E includes incremental component calculation module 131, simple linear regression coefficient calculation module 191 and simple linear regression coefficients b1 192 and b0 193. Incremental component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. The output of component calculation module 131 will be used as the input of simple linear regression coefficient calculation module 191, and simple linear regression coefficient calculation module 191 will generate simple linear regression coefficients b1 192 and b0 193.

Storage media 121X comprises a data set 123X, and storage media 121Y comprises a data set 123Y. As depicted, data set 123X comprises multiple data elements stored in multiple locations of storage media 121X. For example, data elements 101$x$, 102$x$, 103$x$, 104$x$, 105$x$ and 106$x$ are stored in locations 121XE, 121XF, 121XC, 121XD, 121XB and 121XA of storage media 121X respectively, and there are multiple other data elements stored in other locations of storage media 121X. Similarly, data set 123Y comprises multiple data elements stored in multiple locations of storage media 121Y. For example, data elements 101y, 102y, 103y, 104y, 105y and 106y are stored in locations 121YE, 121YF, 121YC, 121YD, 121YB and 121YA of storage media 121Y respectively, and there are multiple other data elements stored in other locations of storage media 121Y.

Computation set 122XY, a non-empty computation set of data set 123X and 123Y, contains multiple pairs of data elements from the two data sets with each pair containing one data element from each data sets. For example computation set 122XY includes (103x, 103y), (104x, 104y), (105x, 105y) and (106x, 106y) of data sets 123X and 123Y.

Whenever accessing a pair of data elements from the storage media, the computing device adjusts the computation set by adding the pair of data elements to the computation set and adjusts the computation set size counter 118 by increasing its content or value by 1. Computation set size counter 118 may be accessed or received by component calculation module 131, and it may be set to a specific value by reset module 129 when incremental simple linear regression coefficient calculation starts working on a non-empty computation set. For example, in 100E, before accessing a pair of data elements (101x, 101y), computation set 122XY contains 4 pairs of data elements, so computation set size counter 118 may be initialized to 4. When a pair of data elements (101x, 101y) is accessed from locations (121XE, 121YE), (101x, 101y) is added to computation set 122XY, and computation set 122XY may become computation set 122XYA, and the value of computation set size counter 118 is increased by 1. Both computation set size counter 118 and data element (101x, 101y) may be accessed or received by component calculation module 131.

Subsequently, a pair of data elements (102x, 102y) may be accessed from locations (121XF, 121YF). (102x, 102y) may be added to computation set 122XYA, and computation set 122XYA may become computation set 122XYB, and the value of computation set size counter 118 will be increased by 1. Both the modified computation set size counter 118 and the pair of data elements (102x, 102y) may be accessed or received by component calculation module 131.

Incremental simple linear regression coefficient calculation starts from a computation set where a computation set size counter and one or more components of simple linear regression coefficients for the computation set may have already been initialized or calculated. If not, the computation set size counter may be initialized with the number of pairs of data elements in the computation set, and one or more components may be initialized based on their definitions using the data elements in the computation set. For example, in computing device architecture 100E, components ranging from $Cd_1$ 141 to $Cd_v$ 145 may have been initialized. As depicted in FIG. 1E, component $Cd_1$ 141 includes contribution 151 (a contribution pairs of data elements (106x, 106y), (105x, 105y), (103x, 103y) and (104x, 104y)), contribution 152 (a contribution from a pair of data elements (101x, 101y)), and contribution 153 (contributions from a pair of data elements (102x, 102y)). Similarly, component $Cd_v$ 145 includes contribution 181 (a contribution pairs of data elements (106x, 106y), (105x, 105y), (103x, 103y) and (104x, 104y)) and contribution 182 (a contribution from a pair of data elements (101x, 101y)), and contribution 183 (contributions from a pair of data elements (102x, 102y)).

Referring to computing device architecture 100A, incremental component calculation module 131 comprises v (v=p≥1) component calculation modules for calculating v components for data elements in the computation set. The number v varies depending on the incremental algorithm chosen. As depicted in FIG. 1E, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and incremental algorithm 133 for incrementally calculating component $Cd_1$. Calculation module 162 comprises initialization module 138 for initializing component $Cd_v$ and incremental algorithm 139 for incrementally calculating component $Cd_v$. Initialization module 132 is configured to initialize component $Cd_1$ for data elements in the computation set and Initialization module 138 is configured to initialize component $Cd_v$ for data elements in the computation set. Component $Cd_1$ 141 is the initial value of component $Cd_1$. Initialization module 132 may be used for an initialization of component $Cd_1$ or when simple linear regression coefficient calculations are reset. Initialization module 132 either initialize component $Cd_1$ 141 to be zero if the computation set is empty (the computation set size counter is zero) or a specific value contribution 151 passed in by reset module 129 if the computation set is non-empty. Similarly, initialization module 138 may be used for an initialization of component $Cd_v$ or when simple linear regression coefficient calculations are reset. Component $Cd_v$ 145 is the initial value of component $Cd_v$. Initialization module 138 either initialize component $Cd_v$ 145 to be zero if the computation set is empty (the computation set size counter is zero) or a specific value contribution 181 passed in by reset module 129 if the computation set is non-empty.

Incremental algorithms are also configured to calculate v components for data elements in the computation set. Incremental algorithm 133 accesses or receives a prior component $Cd_1$ value and the accessed or received pair of data elements as input. Incremental algorithm 133 directly incrementally calculates a component $Cd_1$ for the modified computation set based on the prior component $Cd_1$ value and the added pair of data elements. Contribution addition module 133A may add a contribution for the added pair of data elements to the prior component $Cd_1$. Adding a contribution for the added pair of data elements may be used to calculate component $Cd_1$ for the modified computation set. Incremental algorithm 139 works in a similar way as incremental algorithm 133. Incremental algorithm 139 receives a prior component $Cd_v$ value and an accessed or received pair of data elements from the computation set as input. Incremental algorithm 139 directly incrementally calculates a component $Cd_v$ for the modified computation set based on the prior component $Cd_v$ value and the added pair of data elements. Contribution addition module 139A may add a contribution for the added pair of data elements to the prior component $Cd_v$. Adding a contribution for the added pair of data elements may be used to calculate component $Cd_v$ for the modified computation set.

Referring to FIG. 1E, computing device architecture 100E also includes simple linear regression coefficient calculation module 191. Once p (p 1) components of simple linear regression coefficients are incrementally calculated by component calculation module 131, simple linear regression coefficient calculation module 191 may calculate the simple linear regression coefficients b1 192 and b0 193 based on one or more incrementally calculated or initialized components.

Figure 1F:
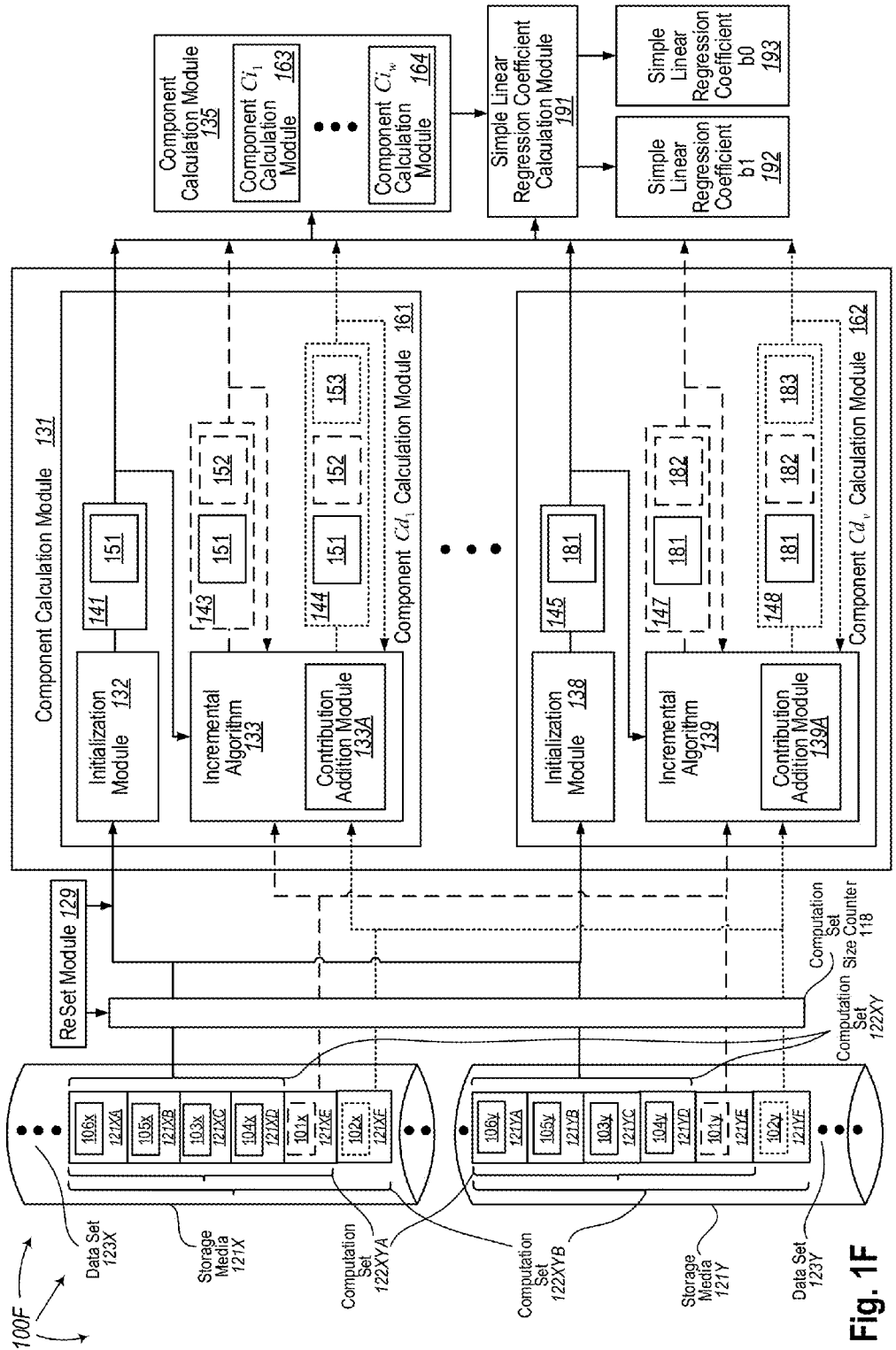
FIG. 1F illustrates an example computing device architecture that facilitates incrementally calculating simple linear regression coefficients for Big Data with two inputs with some components being directly incrementally calculated and some components being indirectly incrementally calculated.

FIG. 1F illustrates an example computing device architecture 100F that facilitates incrementally calculating simple linear regression coefficients for Big Data with two inputs with some (v (1≤v<p)) components being directly incrementally calculated and some (w (w=p−v)) components being indirectly incrementally calculated. Number v and number w are algorithm dependent. Many parts included in computing device architectures 100F and 100E have same reference numbers. Those parts have similar structures and work in similar ways. In certain implementations, the difference between computing device architectures 100F and 100E may be that architecture 100F includes a component calculation module 135. All parts except component calculation module 135 in 100F work in a similar way as those parts with the same reference numbers in 100A. Instead of repeating what have already been explained in the description about 100A, only the different part is discussed here. The number v in 100F may not be the same number v as in 100E, because some directly incrementally calculated components in 100E are indirectly incrementally calculated in 100F. In 100E, v=p≥1, but in 100F, 1≤v<p. Referring to FIG. 1F, computing device architecture 100F includes component calculation module 135. The output of components calculation module 131 may be used as the input of component calculation module 135, and the output of calculation modules 131 and 135 may be used as the input of simple linear regression coefficient calculation module 191, and simple linear regression coefficient calculation module 191 may generate simple linear regression coefficients b1 192 and b0 193. Component calculation module 135 generally includes w=p−v component calculation modules for indirectly incrementally calculating w components. For example, Component calculation module 135 includes calculation module 163 for indirectly incrementally calculating component $Ci_1$ and calculation module 164 for indirectly incrementally calculating component $Ci_w$, and there are w−2 component calculation modules in between. Indirectly incrementally calculating w components includes indirectly incrementally calculating each of the w components one by one. Indirectly incrementally calculating a component includes accessing and using one or more components other than the component itself. The one or more components may be initialized, directly incrementally calculated or indirectly incrementally calculated.

Referring to computing device architecture 100F, once all p (p=v+w) components have been incrementally calculated, simple linear regression coefficient calculation module 191 may be used for calculating simple linear regression coefficients b1 192 and b0 193 as needed based on one or more incrementally calculated or initialized components.

Figure 1G:
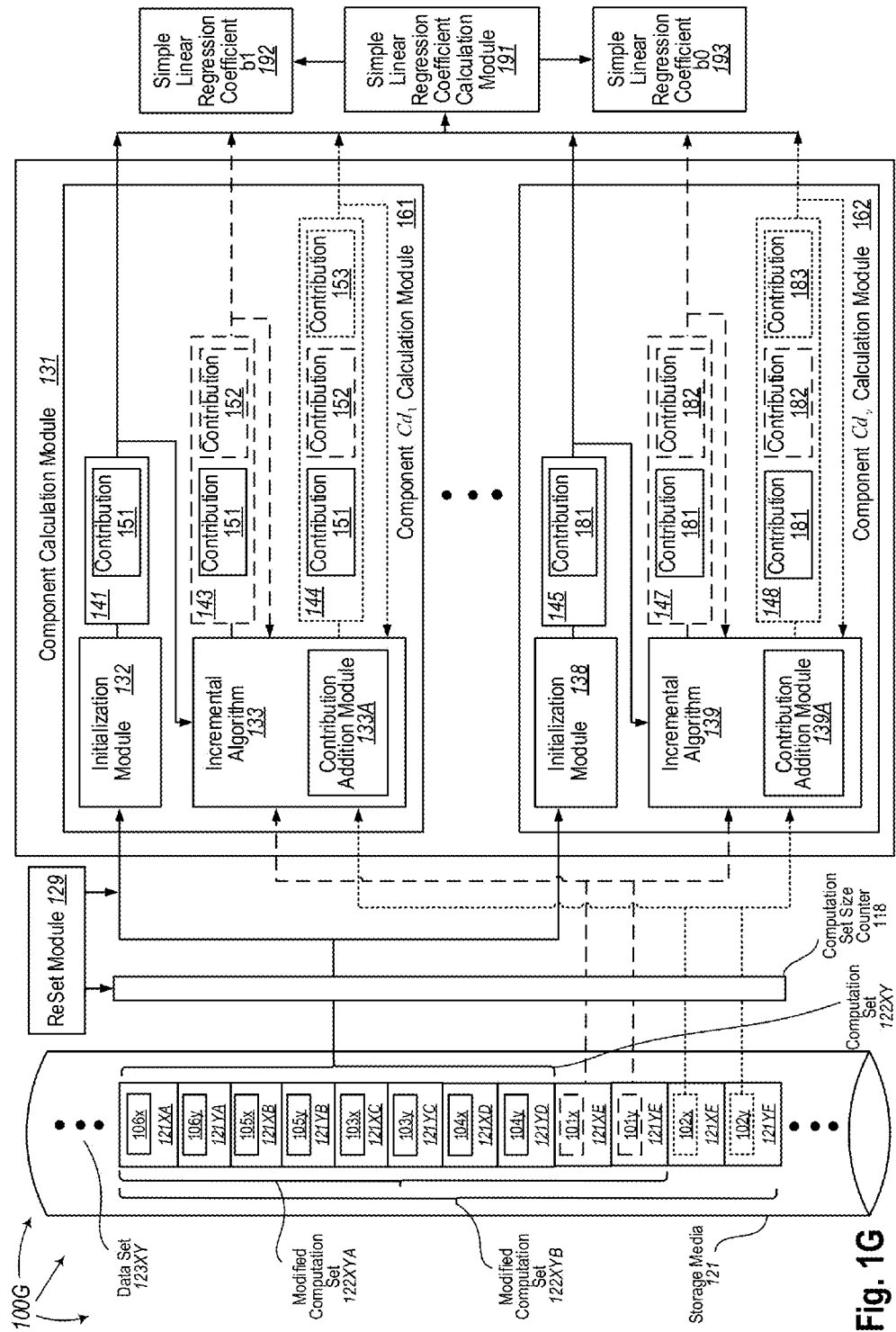
FIG. 1G illustrates an example computing device architecture that facilitates incrementally calculating simple linear regression coefficients for Big Data with a single input where data elements from two Big Data sets are interleaved with all components being directly incrementally calculated.

FIG. 1G illustrates an example computing device architecture 100F that facilitates incrementally calculating simple linear regression coefficients for Big Data with a single input where data elements from two Big Data sets are interleaved with all (v=p≥1) components being directly incrementally calculated. In certain implementations, the difference between computing device architectures 100G and 100E may be that architecture 100G uses a single input where two sets of data elements are interleaved. All parts except the input mode in 100G work in a similar way as those parts with the same reference numbers in 100E. Instead of repeating what have already been explained in the description about 100E, only the different part is discussed here. Referring to FIG. 1G, there is a storage media 121. Storage media 121 includes a data set 123XY where data elements from data set 123X and data set 123Y in FIG. 1E are interleaved, i.e., data elements from two data sets are placed alternatively. As pairs of data elements are accessed, the data elements are accessed from locations that may be next to each other. For example, a pair of data elements (106x, 106y), (105x, 105y), (103x, 103y) or (104x, 104y) may be accessed from locations (121XA, 121YA), (121XB, 121YB), (121XC, 121YC) or (121XD, 121YD) respectively where their locations are next to each other. Computation set 122XY contains 4 pairs of data elements: (106x, 106y), (105x, 105y), (103x, 103y) and (104x, 104y). The computing device may use data elements in computation set 122XY for initializing one or more components of simple linear regression coefficients.

Next, a pair of data elements (101x, 101y) to be added to computation set 122XY may be accessed or received. Data elements (101x, 101y) may be accessed from locations (121XE, 121YE). After (101x, 101y) is added to computation set 122XY, computation set 122XY may become modified computation set 122XYA, and the value of computation set size counter 118 is increased by 1. The computing system may incrementally calculate simple linear regression coefficients for modified computation set 122XYA.

Subsequently, a pair of data elements (102x, 102y) to be added to modified computation set 122XYA may be accessed or received. Data elements (102x, 102y) may be accessed from location (121XF, 121YF). After (102x, 102y) is added to modified computation set 122XYA, modified computation set 122XYA may become modified computation set 122XYB, and the value of computation set size counter 118 is increased by 1. The computing system may incrementally calculate simple linear regression coefficients for modified computation set 122XYB.

Referring to FIG. 1G, computing device architecture 100G also includes simple linear regression coefficient calculation module 191 and simple linear regression coefficient b1 192 and b0 193. Once p (p=v≥1) components of simple linear regression coefficients are incrementally calculated by component calculation module 131, simple linear regression coefficient calculation module 191 may calculate the simple linear regression coefficient b1 192 and b0 193 as needed using one or more incrementally calculated or initialized components.

Figure 1H:
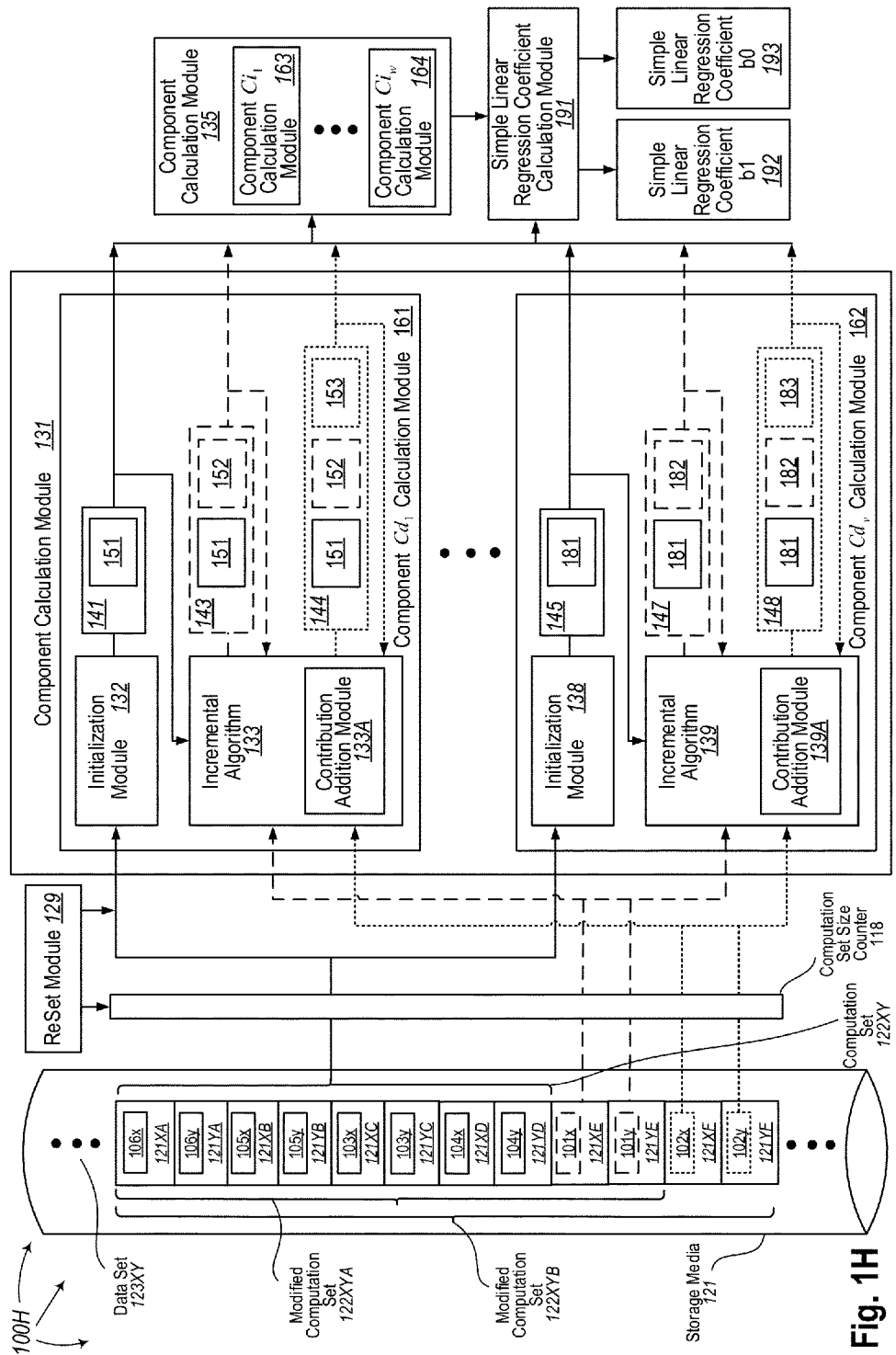
FIG. 1H illustrates an example computing device architecture that facilitates incrementally calculating simple linear regression coefficients for Big Data with a single input where data elements from two Big Data sets are interleaved with some components being directly incrementally calculated and some components being indirectly incrementally calculated.

FIG. 1H illustrates an example computing device architecture 100H that facilitates incrementally calculating simple linear regression coefficients for Big Data with a single input where data elements from two Big Data sets are interleaved with some (v (1≤v<p)) components being directly incrementally calculated and some (w (w=p−v)) components being indirectly incrementally calculated. In certain implementations, the difference between computing device architectures 100H and 100G may be that architecture 100H includes a component calculation module 135. All parts except component calculation module 135 in 100H work in a similar way as those parts with the same reference numbers in 100E and 100G. Instead of repeating what have already been explained in the descriptions about 100E and 100G respectively, only the different part is discussed here. Computing device architecture 100H also includes component calculation module 131, which also includes v component calculation modules for directly incrementally calculating v components, however the number v in 100H may not be the same number v as in 100G, because some directly incrementally calculated components in 100G are indirectly incrementally calculated in 100H. In 100G, v=p≥1, but in 100H, 1≤v<p. Referring to FIG. 1H, computing device architecture 100D includes component calculation module 135. Component calculation module 135 includes w=p−v component calculation modules for indirectly incrementally calculating w components. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing device architecture 100H, once all p (p=v+w) components have been incrementally calculated, simple linear regression coefficient calculation module 191 may be used for calculating simple linear regression coefficients b1 192 and b0 193 as needed based on one or more incrementally calculated or initialized components.

Figure 2:
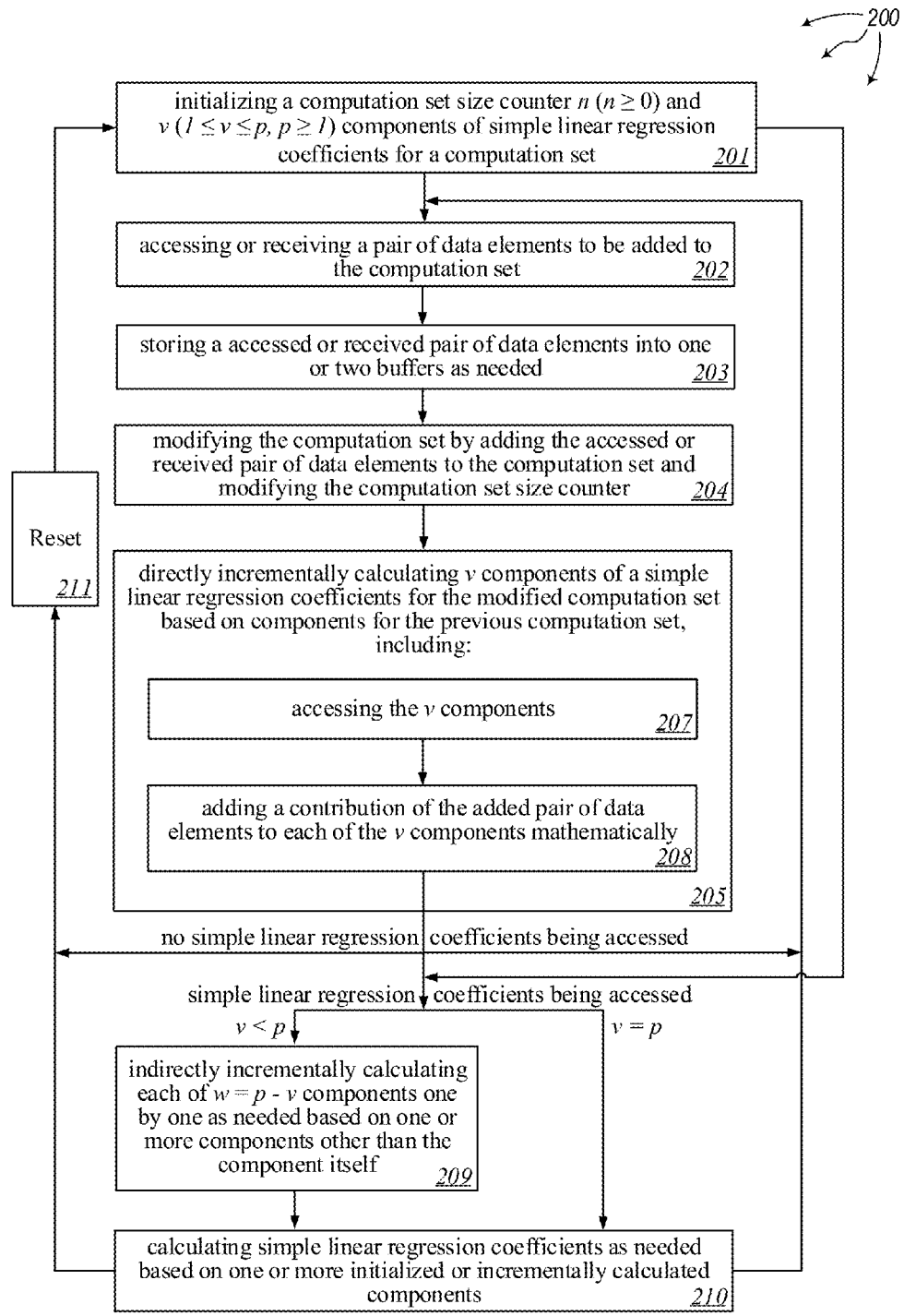
FIG. 2 illustrates a flow chart of an example method for incrementally calculating simple linear regression coefficients for Big Data or streamed data.

FIG. 2 illustrates a flow chart of an example method 200 for incrementally calculating simple linear regression coefficients for Big Data or streamed data. Method 200 will be described with respect to the components and data of computing device architectures 100A, 100B, 100C, 100D, 100E, 100F, 100G and 100H respectively.

Method 200 includes initializing a computation set size counter 118 and v (1≤v≤p, p≥1) components of simple linear regression coefficients (201). For example for computing device architecture 100A, reset module 129 may set initial values for components from component $Cd_1$ to component $Cd_v$ which may be accessed by initialization modules 132 and 138 respectively and a corresponding initial value for computation set size counter 118. Initialization module 131 may access the initial value for component $Cd_1$ and initialize component $Cd_1$ 141 with the value which becomes contribution 151. Similarly, initialization module 138 may access the initial value for component $Cd_v$ and initialize component $Cd_1$ 145 with the value which becomes contribution 181.

Method 200 includes accessing or receiving a pair of data elements to be added to the computation set (202). For example, a pair of data elements (101x, 101y) may be accessed or received.

Method 200 includes storing the accessed or received pair of data elements into one or two data buffers as needed (203). Incremental simple linear regression coefficient calculation algorithms do not need to store the accessed or received data element; however when incremental simple linear regression coefficient calculation combined with iterative simple linear regression coefficient calculation, the accessed or received pair of data elements may need to be stored, so the accessed or received pair of data elements may be stored into one or two data buffers as needed. For example, referring to computing device architectures 100A and 100B, data elements 101x may be stored into optional data buffer 125X and data element 101y may be stored into optional data buffer 125Y, and referring to computing device architectures 100C and 100D, a pair of data elements (101x, 101y) may be stored into a single optional data buffer 125.

Method 200 includes modifying the computation set by adding the accessed or received pair of data elements and modifying the computation set size counter (204). For example, computation set size counter 118 may be modified by increasing its current value by 1 upon accessing or receiving the pair of data elements (101x, 101y).

Method 200 includes calculating v components of simple linear regression coefficients for the modified computation set based on v components for the previous computation set (205). For example, incremental algorithm 133 may be used for directly incrementally calculating component $Cd_1$ 143 by reusing component $Cd_1$ 141 and the pair of data elements (101x, 101y), and incremental algorithm 139 may be used for directly incrementally calculating component $Cd_v$ 147 based on component $Cd_v$ 145 and the pair of data elements (101x, 101y).

Directly incrementally calculating v components of simple linear regression coefficients for the modified computation set includes accessing the v components of the simple linear regression coefficients for the previous computation set (207). For example for computing device architecture 100A, incremental algorithm 133 may access component $Cd_1$ 141, and incremental algorithm 139 may access component $Cd_v$ 145.

Directly incrementally calculating v components of simple linear regression coefficients for the modified computation set includes adding a contribution of the added pair of data elements to each of the v components mathematically (208). For example for computing device architecture 100A, incrementally calculating component $Cd_1$ 143 may include contribution addition module 133A adding contribution 152 to component 141 mathematically, and incrementally calculating component $Cd_v$ 147 may include contribution addition module 139A adding contribution 182 to component $Cd_v$ 145 mathematically. Contribution 152 and 182 are contributions of the pair of data elements (101x, 101y).

As depicted in FIG. 1A, component $Cd_1$ 143 includes contribution 151 and contribution 152, and component $Cd_v$ 147 includes contribution 181 and contribution 182. Contribution 151 is a contribution from initialization. Contribution 152 is a contribution from the pair of data elements (101x, 101y). Contribution 181 is a contribution from initialization. Contribution 182 is a contribution from the pair of data elements (101x, 101y).

Besides directly incrementally calculated components, some components may be indirectly incrementally calculated. Method 200 includes indirectly incrementally calculating each of w=p−v components one by one as needed based on one or more components other than the component itself (209) when v<p, i.e., not all components are directly incrementally calculated. Since the w indirectly incrementally calculated components are calculated using other components, they might not need to be initialized. In addition, the w indirectly incrementally calculated components might not need to be calculated in every iteration (i.e., when a pair of data elements is added to the computation set). The w components only need to be calculated when simple linear regression coefficients are accessed. For example, referring to FIG. 1B where some components are directly incrementally calculated and some are indirectly incrementally calculated, calculation module 163 may indirectly incrementally calculate $Ci_1$ based on one or more components other than $Ci_1$, and calculation module 164 may indirectly incrementally calculate $Ci_w$ based on one or more components other than $Ci_w$. The one or more components may have been initialized, directly incrementally calculated or indirectly incrementally calculated. For a given component, it may be directly incrementally calculated in one algorithm but indirectly incrementally calculated in another algorithm. For a given algorithm, directly incrementally calculated components must be calculated whenever a pair of data elements is added to the computation set, no matter if simple linear regression coefficients are accessed or not; However, an indirectly incrementally component only needs to be calculated as needed, i.e., when simple linear regression coefficients are accessed. For example, referring to FIG. 4C, in Incremental Algorithm 1, indirectly incrementally calculated component $b1_{k+1}$ and $b0_{k+1}$ only need to be calculated when simple linear regression coefficients $b1_{k+1}$ and $b0_{k+1}$ are accessed.

Method 200 includes calculating simple linear regression coefficients as needed using one or more incrementally calculated components of the simple linear regression (210). For example, calculation module 191 may calculate simple linear regression coefficients b1 192 and b0 193 based on one or more incrementally calculated components, e.g., component $Cd_1$ 143 and component $Cd_v$ 147. 202-208 may be repeated as additional pairs of data elements are accessed or received. 209-210 may be repeated as needed. For example, subsequent to calculating components ranging from $Cd_1$ 143 to $Cd_v$ 147, a pair of data elements (102x, 102y) may be accessed or received.

Incremental algorithm 133 may be used for directly incrementally calculating component $Cd_1$ 144 based on component $Cd_1$ 143. Incremental algorithm 133 may access component $Cd_1$ 143. Incrementally calculating component $Cd_1$ 144 may include contribution addition module 133A adding contribution 153 to component $Cd_1$ 143 mathematically. Contribution 153 is a contribution from the pair of data elements (102x, 102y). Similarly, incremental algorithm 139 may be used for directly incrementally calculating component $Cd_v$ 148 based on component $Cd_v$ 147. Incremental algorithm 139 may access component $Cd_v$ 147. Incrementally calculating component $Cd_v$ 148 may include contribution addition module 139A adding contribution 183 to component $Cd_v$ 147 mathematically. Contribution 183 is a contribution from the pair of data elements (102x, 102y). As depicted, component $Cd_1$ 144 includes contribution 151 (a contribution from initialization), contribution 152 (a contribution from the pair of data elements (101x, 101y)), and contribution 153 (a contribution from the pair of data elements (102x, 102y)); component $Cd_v$ 148 includes contribution 181 (a contribution from initialization), contribution 182 (a contribution from the pair of data elements (101x, 101y)), and contribution 183 (a contribution from the pair of data elements (102x, 102y)). When an additional pair of data elements is accessed or received, component $Cd_1$ 144 may be used for directly incrementally calculating component $Cd_1$ for the modified computation set and component $Cd_v$ 148 may be used for directly incrementally calculating component $Cd_v$ for the modified computation set.

As depicted in FIG. 2, reset 211 may be used for resetting incremental simple linear regression coefficient calculation. When reset 211 is invoked either after 205 or 210, the computation set size counter and v components of simple linear regression coefficients will be reset or initialized. For example, component $Cd_1$ 141 may be initialized as zero when the computation set size counter is reset to zero or a specific value that has already been calculated when the computation set size counter is non-zero. The latter case may happen when combining incremental simple linear regression coefficient calculation with iterative simple linear regression coefficient calculation or decremental simple linear regression coefficient calculation. Component $Cd_v$ 145 may be initialized in the same way.

Figure 3A:
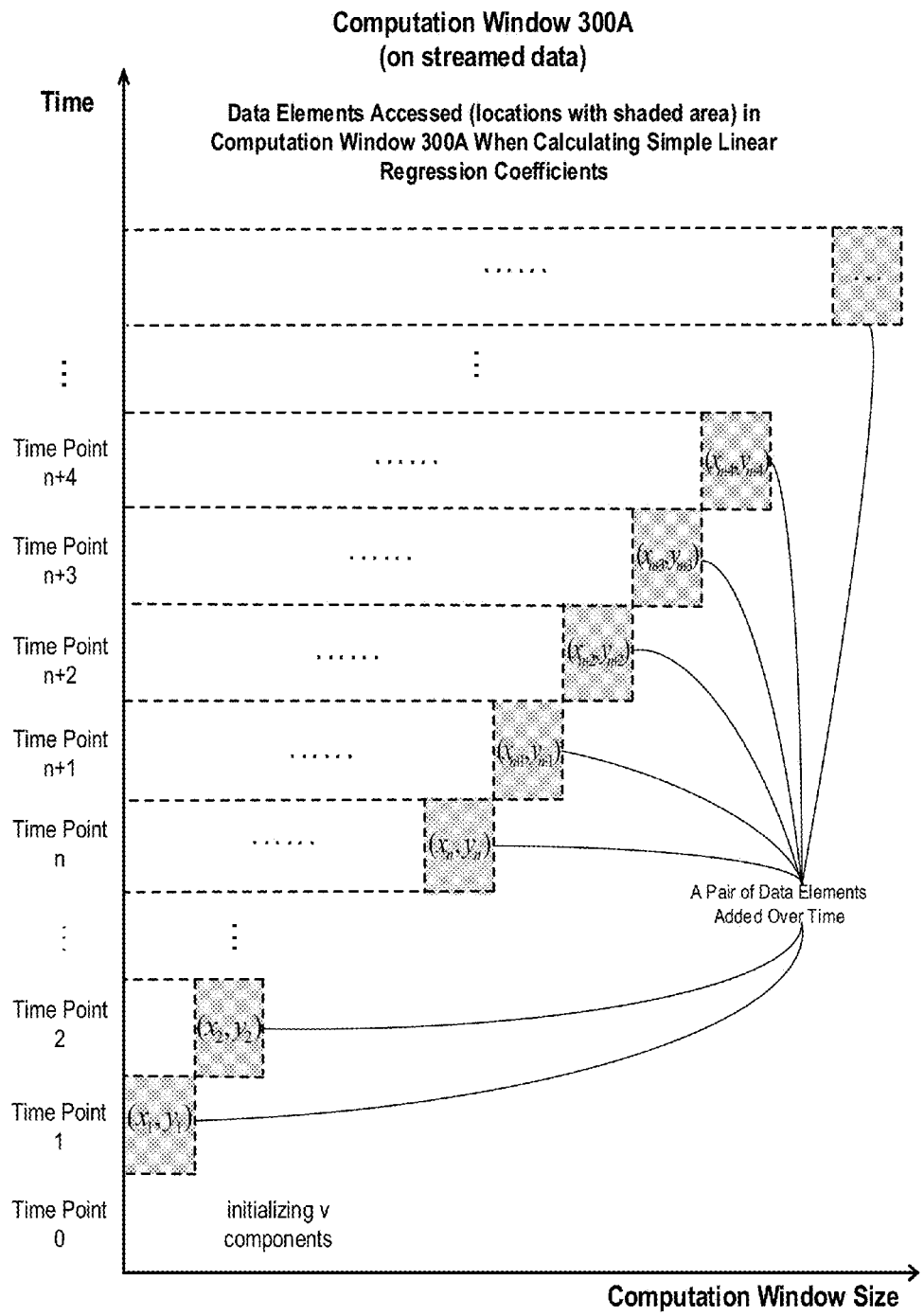
FIG. 3A illustrates data elements that are accessed from a computation window for incrementally calculating simple linear regression coefficients on streamed data.

FIG. 3A illustrates data elements that are accessed from a computation window 300A for incrementally calculating simple linear regression coefficients on streamed data. The difference between a computation window and a computation set is that the pairs of data elements in a computation window are ordered (e.g., a pair of data elements is always added to either the right end or the left end of a computation window). For example, referring to FIG. 3A, an accessed or received pair of data elements is always added to the right end of computation window 300A. Computation window 300A may be either empty from very beginning or non-empty where v ($1 \le v \le p$) components have already been calculated. As time progresses, pairs of data elements, for example, data element ($x_1, y_1$), then ($x_2, y_2$), then ($x_3, y_3$), then ($x_n, y_n$), ($x_{n+1}, y_{n+1}$), is added to the computation window and accessed respectively for directly incrementally calculating v components of simple linear regression coefficients for the modified computation set, indirectly incrementally calculating w=p−v components, and calculating the simple linear regression coefficients using one or more incrementally calculated components. The v components may be directly incrementally calculated based on the added pair of data elements and the v components for the previous computation window, and other data elements in computation window 300A are not touched. For a given incremental algorithm, v is a constant, so the number of operations for directly incrementally calculating v components is a constant, and the number of operations for indirectly incrementally calculating w=p−v components is also a constant. So, the computation workload for calculating all p components for a given computation window with size n is reduced. Simple linear regression coefficients may then be calculated based on one or more incrementally calculated components, thus the overall computation workload is reduced. The larger the n, the more substantial the reduction in computation workload.

Figure 3B:
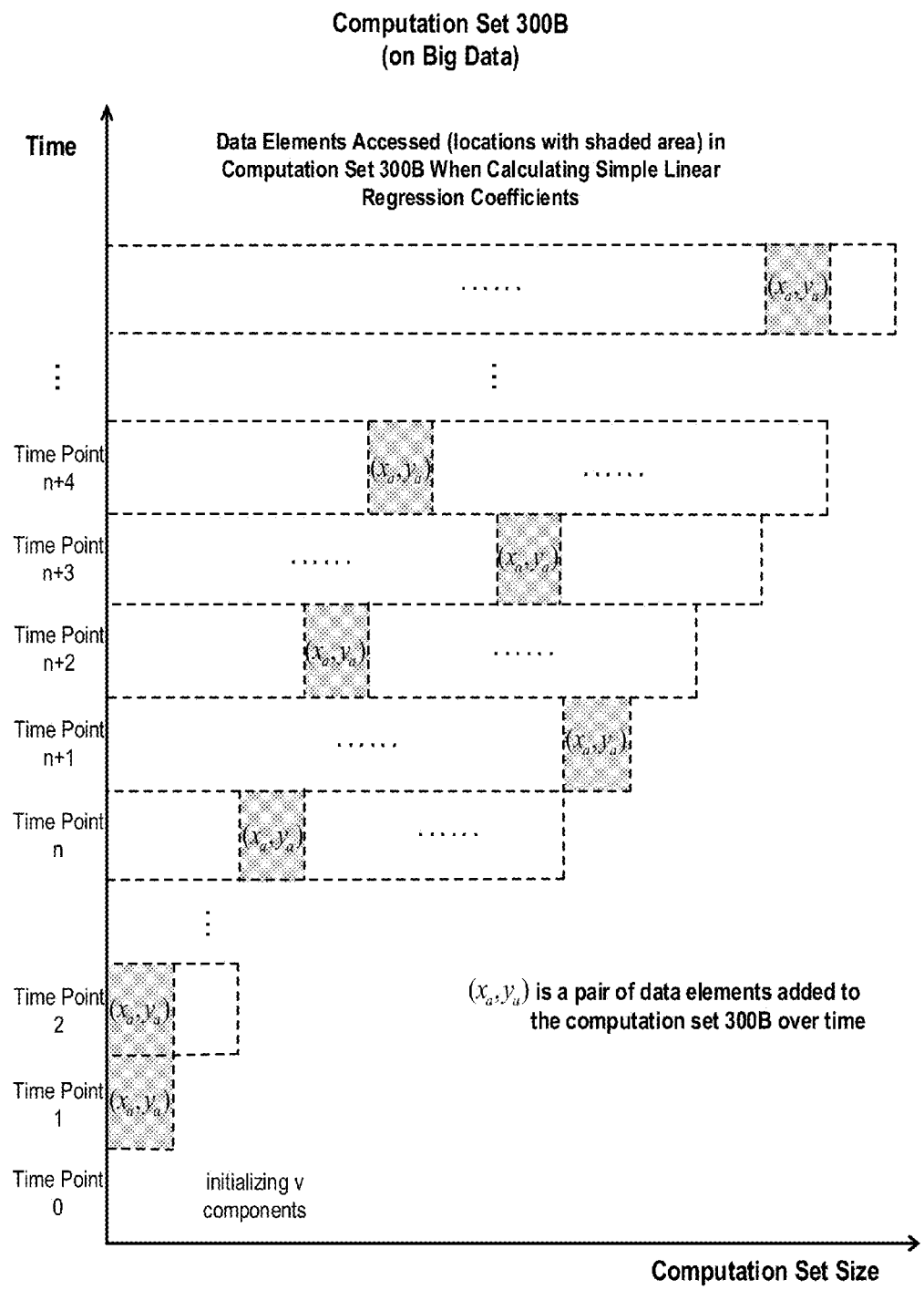
FIG. 3B illustrates data elements that are accessed from a computation set for incrementally calculating simple linear regression coefficients on Big Data.

FIG. 3B illustrates data elements that are accessed from a computation set 300B for incrementally calculating simple linear regression coefficients on Big Data. The difference between a computation set and a computation window is that the pairs of data elements in a computation set are not ordered (e.g., a pair of data elements may be added into any position within a computation set). For example, referring to FIG. 3B, a newly accessed or received pair of data elements may be added to any position of computation set 300B. Computation set 300B may be either empty from very beginning or non-empty where v ($1 \le v \le p$) components have already been calculated. As time progresses, a pair of data elements, for example, data element ($x_a, y_a$), is added to the computation set at the position indicated by shaded area and accessed respectively for incrementally calculating v components of simple linear regression coefficients for the modified computation set, indirectly incrementally calculating v=p−v components, and calculating the simple linear regression coefficients using one or more incrementally calculated components. The v components may be directly incrementally calculated based on the added pair of data elements and the v components for the previous computation set, and other data elements in computation set 300B are not touched. For a given incremental algorithm, v is a constant, so the number of operations for directly incrementally calculating v components is a constant, and the number of operations for indirectly incrementally calculating w=p−v components is also a constant. So, the computation workload for calculating all p components for a given computation set with size n is reduced. Simple linear regression coefficients may then be calculated using one or more incrementally calculated components, thus the overall computation workload is reduced from. The larger the n, the more substantial the reduction in computation workload.

A few examples of components of simple linear regression coefficients and example incremental simple linear regression coefficient calculation algorithms may be found in the following sections.

FIG. 4A illustrates the definitions of simple linear regression coefficients. Suppose a computation set XY={($x_i, y_i$)

|i=1, ..., n} contains the data elements to be involved in simple linear regression coefficient calculation, where data elements $x_1, x_2, x_3, x_4, \ldots, x_n$ are observed data from a predictor variable X and data elements $y_1, y_2, y_3, y_4, \ldots, y_n$ are observed data from a response variable Y, simple linear regression coefficients need to be calculated. Equation 401 is a definition equation for simple linear regression coefficient b1. Equation 402 is a definition equation for simple linear regression coefficient b0. Equation 403 is a traditional equation for calculating a sum $XS_k$ of all the data elements of X variable in computation set XY in the $k^{th}$ iteration. Equation 404 is a traditional equation for calculating a sum $YS_k$ of all the data elements of Y variable in computation set XY in the $k^{th}$ iteration. Equation 405 is a traditional equation for calculating a mean $\bar{x}_k$ of all the data elements of X variable in computation set XY in the $k^{th}$ iteration. Equation 406 is a traditional equation for calculating a mean $\bar{y}_k$ of all the data elements of Y variable in computation set XY in the $k^{th}$ iteration. Equation 407 is a traditional equation for calculating simple linear regression coefficient $b1_k$ for computation set XY in the $k^{th}$ iteration. Equation 408 is a traditional equation for calculating simple linear regression coefficient $b0_k$ for the computation set XY in the $k^{th}$ iteration.

Assuming computation set XY of size n is changed with a pair of data elements $(x_a, y_a)$ being added. Whenever a pair of data elements is added, the computation set is considered as a modified computation set. The size of modified computation set XY becomes n+1. A new iteration of calculation is started each time any component of simple linear regression coefficients is recalculated due to a data change in the computation set. Equation 409 may be used for calculating a sum $XS_{k+1}$ of all the data elements of X variable in modified computation set XY in the k+1$^{th}$ iteration. Equation 410 may be used for calculating a sum $YS_{k+1}$ of all the data elements of Y variable in modified computation set XY in the k+1$^{th}$ iteration. Equation 411 may be used for calculating a mean $\bar{x}_{k+1}$ of all the data elements of X variable in modified computation set XY in the k+1$^{th}$ iteration. Equation 412 may be used for calculating a mean $\bar{y}_{k+1}$ of all the data elements of Y variable in modified computation set XY in the k+1$^{th}$ iteration. Equation 413 may be used for calculating a simple linear regression coefficient $b1_{k+1}$ for the modified computation set XY in the k+1$^{th}$ iteration. Equation 414 may be used for calculating a simple linear regression coefficient $b0_{k+1}$ for the modified computation set XY in the k+1$^{th}$ iteration.

FIG. 4B illustrates some components of simple linear regression coefficients and basic incremental component calculation equations. A component of simple linear regression coefficients is a quantity or expression appearing in the simple linear regression coefficients' definition equations or any transforms of the definition equations. The following are a few example components of simple linear regression coefficients.

$$XS_k = \Sigma_1^n x_i$$

$$XS_k = \Sigma_1^n y_i$$

$$\bar{x}_k = \frac{XS_k}{n} = \frac{1}{n}\sum_1^n x_i$$

$$\bar{y}_k = \frac{YS_k}{n} = \frac{1}{n}\sum_1^n y_i$$

$$XSS_k = \Sigma_1^n x_i^2$$

$$XV_k = \sum_1^n x_i^2 - n\bar{x}_k^2 = XSS_k - \frac{XS_k^2}{n} = XSS_k - n\bar{x}_k^2$$

$$SSDX_k = \sum_1^n \left(x_i - \frac{XS_k}{n}\right)^2 = \sum_1^n (x_i - \bar{x}_k)^2$$

$$SDXY_k = \sum_1^n (x_i - \bar{x}_k)(y_i - \bar{y}_k) = \sum_1^n \left(x_i - \frac{XS_k}{n}\right)(y_i - \bar{y}_k) =$$
$$\sum_1^n (x_i - \bar{x}_k)\left(y_i - \frac{YS_k}{n}\right) = \sum_1^n \left(x_i - \frac{XS_k}{n}\right)\left(y_i - \frac{YS_k}{n}\right)$$

$$SXY_k = \sum_1^n x_i y_i$$

$$x\sigma_k^2 = \frac{\sum_1^n x_i^2}{n} - \bar{x}_k^2 = \frac{\sum_1^n x_i^2}{n} - \left(\frac{XS_k}{n}\right)^2$$

$$b1_k = \frac{\sum_1^n (x_i - \bar{x}_k)(y_i - \bar{y}_k)}{\sum_1^n (x_i - \bar{x}_k)^2} = \frac{\sum_1^n \left(x_i - \frac{XS_k}{n}\right)(y_i - \bar{y}_k)}{\sum_1^n \left(x_i - \frac{XS_k}{n}\right)^2} =$$
$$\frac{\sum_1^n (x_i - \bar{x}_k)\left(y_i - \frac{YS_k}{n}\right)}{\sum_1^n (x_i - \bar{x}_k)^2} = \frac{\sum_1^n \left(x_i - \frac{XS_k}{n}\right)\left(y_i - \frac{YS_k}{n}\right)}{\sum_1^n \left(x_i - \frac{XS_k}{n}\right)^2}$$

$$b0_k = \frac{YS_k}{n} - b1_k \frac{XS_k}{n} = \frac{YS_k}{n} - b1_k \bar{x}_k = \bar{y}_k - b1_k \frac{XS_k}{n} = \bar{y}_k - b1_k \bar{x}_k$$

There are two simple linear regression coefficients $b1_k$ and $b0_k$. Since $b1_k$ appears in $b0_k$'s definition equation, $b1_k$ is a component of $b0_k$, and all $b1_k$'s components are also $b0_k$'s components. Component $b0_k$'s components $\bar{x}_k$ and $\bar{y}_k$ also appear in $b1_k$'s definition equation, so $\bar{x}_k$ and $\bar{y}_k$ are also $b1_k$'s components. Thus, simple linear regression coefficients $b1_k$ and $b0_k$ may be considered to share some common components. $SDXY_k$, $SSDX_k$, $\bar{x}_k$ and $\bar{y}_k$ are components of simple linear regression coefficients because they directly appear in the definition of simple linear regression coefficients. $SXY_k$, $XSS_k$ and $XV_k$ are also components of simple linear regression coefficients because they appear in a transform expression of simple linear regression coefficients' definition. Even simple linear regression $$b1_k = \frac{\sum_1^n (x_i - \bar{x}_k)(y_i - \bar{y}_k)}{\sum_1^n (x_i - \bar{x}_k)^2}$$

itself is considered as a component because it is the largest component appearing in the definition of simple linear regression coefficient $b1_k$. Similarly, $b0_k$ is also the largest component of $b0_k$ itself. Simple linear regression coefficients may be calculated based on one or more components or combinations of them. For example, if $$SDXY_k = \sum_1^n (x_i - \bar{x}_k)(y_i - \bar{y}_k)$$

and $SSDX_k = \sum_1^n (x_i - \bar{x}_k)^2$ are known, simple linear regression coefficient $b1_k$ may be calculated, and coefficient $b0_k$ may then be calculated too. If all required components may be incrementally calculated, then simple linear regression coefficients may be incrementally calculated. The number of components to be used varies depending on a specific incremental simple linear regression coefficient calculation algorithm chosen. Since multiple components of simple linear regression coefficients and even more combinations of the components exist, there are multiple ways (algorithms) supporting incremental simple linear regression coefficient calculation. To illustrate how to use components to incrementally calculate simple linear regression, three different incremental simple linear regression coefficient calculation algorithms are presented as examples in the following sections. A new iteration of calculation is started each time any component of simple linear regression coefficients is recalculated due to a data change in the computation set which causes a computation set to change to a modified computation set. A sum or a mean is the basic component to be used for calculating simple linear regression coefficients. Equation 415 may be used for directly incrementally calculating a sum $XS_{k+1}$ of all the data elements of X variable in the modified computation set XY. Equation 416 may be used for directly incrementally calculating a sum $YS_{k+1}$ of all the data elements of Y variable in the modified computation set XY. Equation 417 may be used for directly incrementally calculating a mean $\bar{x}_{k+1}$ of all the data elements of X variable in the modified computation set XY. Equation 418 may be used for directly incrementally calculating a mean $\bar{y}_{k+1}$ of all the data elements of Y variable in the modified computation set XY. Either a sum $XS_{k+1}$ or a mean $\bar{x}_{k+1}$ and either a sum $YS_{k+1}$ or a mean $\bar{y}_{k+1}$ will be used in all three incremental simple linear regression coefficient calculation algorithms described below.

FIG. 4C illustrates the first example incremental simple linear regression coefficient calculation algorithm (incremental algorithm 1) for incrementally calculating simple linear regression coefficients. Equation 415 may be used for directly incrementally calculating a sum $XS_{k+1}$ of X variable in modified computation set XY in the $k+1^{th}$ iteration. Equation 416 may be used for directly incrementally calculating a sum $YS_{k+1}$ of Y variable in modified computation set XY in the $k+1^{th}$ iteration. Equation 417 may be used for directly incrementally calculating a mean $\bar{x}_{k+1}$ of X variable in modified computation set XY in the $k+1^{th}$ iteration. Equation 418 may be used for directly incrementally calculating a mean $\bar{y}_{k+1}$ of Y variable in modified computation set XY in the $k+1^{th}$ iteration. Equation 419 is a traditional equation for calculating $XSS_k$ in computation set XY in the $k^{th}$ iteration. Equation 420 is a traditional equation for calculating $XSS_{k+1}$ in modified computation set XY in the $k+1^{th}$ iteration. Equation 421 may be used for directly incrementally calculating $XSS_{k+1}$ in modified computation set XY in the $k+1^{th}$ iteration if $XSS_k$ is available. Equations 422 may be used for calculating $XV_k$ in computation set XY if components $XSS_k$, $XS_k$ or $\bar{x}_k$ are available. Equations 422 comprise multiple equations but only one is needed depending on whether a sum or a mean is available. Equations 423 are equations for indirectly incrementally calculating $XV_{k+1}$ in modified computation set XY if components $XSS_{k+1}$, $XS_{k+1}$ or $\bar{x}_{k+1}$ are available. Equations 423 comprise multiple equations but only one is needed depending on whether a sum or a mean is available. Equation 424 is a traditional equation for calculating $SXY_k$ in the $k^{th}$ iteration. Equation 425 is a traditional equation for calculating $SXY_{k+1}$ in the $k+1^{th}$ iteration. Equation 426 may be used for directly incrementally calculating $SXY_{k+1}$ in the $k+1^{th}$ iteration if $SXY_k$ is available. Equation 427 may be used for indirectly incrementally calculating simple linear regression coefficient $b1_{k+1}$ if components $XS_{k+1}$ or $\bar{x}_{k+1}$, $YS_{k+1}$ or $\bar{y}_{k+1}$, $SXY_{k+1}$, and $XV_{k+1}$ are available. Equations 427 comprise multiple equations but only one is needed depending on whether a sum or a mean or both are available. Equations 428 may be used that may be used for indirectly incrementally calculating simple linear regression coefficient $b0_{k+1}$ if components $XS_{k+1}$ or $\bar{x}_{k+1}$, $YS_{k+1}$ or $\bar{y}_{k+1}$, and $b1_{k+1}$ are available. Equations 428 comprise multiple equations but only one is needed depending on whether a sum or a mean or both are available.

FIG. 4D illustrates the second example incremental simple linear regression coefficient calculation algorithm (incremental algorithm 2) for incrementally calculating simple linear regression coefficients. Equation 415 may be used for directly incrementally calculating a sum $XS_{k+1}$ of X variable in modified computation set XY in the $k+1^{th}$ iteration. Equation 416 may be used for directly incrementally calculating a sum $YS_{k+1}$ of Y variable in modified computation set XY in the $k+1^{th}$ iteration. Equation 417 may be used for directly incrementally calculating a mean $\bar{x}_{k+1}$ of X variable in modified computation set XY in the $k+1^{th}$ iteration. Equation 418 may be used for directly incrementally calculating a mean $\bar{y}_{k+1}$ of Y variable in modified computation set XY in the $k+1^{th}$ iteration. Equation 429 is a traditional equation for calculating $SSDX_k$ in computation set XY. Equation 430 is a traditional equation for calculating $SSDX_{k+1}$ in modified computation set XY. Equations 431 may be used for directly incrementally calculating $SSDX_{k+1}$ in modified computation set XY if components $XS_k$ or $\bar{x}_k$ and $XS_{k+1}$ or $\bar{x}_{k+1}$ and $SSDX_k$ are available. Equations 431 comprise multiple equations but only one is needed depending on whether a sum or a mean is available. Equation 432 is a traditional equation for calculating $SDXY_k$ in computation set XY. Equation 433 is a traditional equation for calculating $SDXY_{k+1}$ in modified computation set XY.

Equation 434 may be used for directly incrementally calculating $SDXY_{k+1}$ in modified computation set XY if components $SDXY_k$ with $XS_k$ or $\bar{x}_k$ and $YS_k$ or $y_k$ are available. Equations 434 comprise multiple equations but only one is needed depending on whether a sum or a mean or both are available. Equation 435 may be used for indirectly incrementally calculating simple linear regression coefficient $b1_{k+1}$ if components $SDXY_{k+1}$ and $SSDX_{k+1}$ are available. Equations 436 may be used for indirectly incrementally calculating simple linear regression coefficient $b0_{k+1}$ in the $k+1^{th}$ iteration if components $XS_{k+1}$ or $\bar{x}_{k+1}$, $YS_{k+1}$ or $\bar{y}_{k+1}$, and $b1_{k+1}$ are available. Equations 436 comprise multiple equations but only one is needed depending on whether a sum or a mean or both are available.

FIG. 4E illustrates the third example incremental simple linear regression coefficient calculation algorithm (incremental algorithm 3) for incrementally calculating simple linear regression coefficients. Equation 415 may be used for directly incrementally calculating a sum $XS_{k+1}$ of X variable in modified computation set XY in the $k+1^{th}$ iteration. Equation 416 may be used for directly incrementally calculating a sum $YS_{k+1}$ of Y variable in modified computation set XY in the $k+1^{th}$ iteration. Equation 417 may be used for directly incrementally calculating a mean $\bar{x}_{k+1}$ of X variable in modified computation set XY in the $k+1^{th}$ iteration. Equation 418 may be used for directly incrementally calculating a mean $\bar{y}_{k+1}$ of Y variable in modified computation set XY in the $k+1^{th}$ iteration. Equation 437 is a traditional equation for calculating $XSS_k$ in the computation set XY in the $k^{th}$ iteration. Equation 438 is a traditional equation for calculating $XSS_{k+1}$ in the $k+1^{th}$ iteration. Equation 439 may be used for directly incrementally calculating $XSS_{k+1}$ in the $k+1^{th}$ iteration if $XSS_k$ is available. Equation 440 is a traditional equation for calculating $SXY_k$ in the computation set XY in the $k^{th}$ iteration. Equation 441 is a traditional equation for calculating $SXY_{k+1}$ in the $k+1^{th}$ iteration. Equation 442 may be used for directly incrementally calculating $SXY_{k+1}$ in the $k+1^{th}$ iteration if $SXY_k$ is available. Equations 443 may be used for indirectly incrementally calculating simple linear regression coefficient $b1_{k+1}$ if components $XS_{k+1}$ or $\bar{x}_{k+1}$, $YS_{k+1}$ or $\bar{y}_{k+1}$, $XSS_{k+1}$, and $SXY_{k+1}$ are available. Equations 443 comprise multiple equations but only one is needed depending on whether a sum or a mean or both are available. Equation 444 may be used for indirectly incrementally calculating simple linear regression coefficient $b0_{k+1}$ in the $k+1^{th}$ iteration if components $XS_{k+1}$ or $\bar{x}_{k+1}$, $YS_{k+1}$ or $\bar{y}_{k+1}$, and $b1_{k+1}$ are available. Equations 444 comprise multiple equations but only one is needed depending on whether a sum or a mean or both are available.

To demonstrate incremental simple linear regression coefficient calculation algorithms and their comparison against traditional algorithms, three examples are given below. Three computation sets of data elements are used. For traditional algorithms, the calculations for all three computation sets are exactly the same. For incremental algorithms, initialization of one or more components is performed for the first computation set, and incremental calculations are performed for the second and third computation sets.

FIG. 5A illustrates an example of calculating simple linear regression coefficients on XY Big Data Set 501 using traditional algorithms. XY Big Data Set 501 is either a Big Data set or streamed data. XY computation set 502 includes 4 pairs of data elements from X Big Data Set 501. XY computation set size 503 ($n$) is 4. Equation 405 may be used for calculating $\bar{x}_1$ and equation 406 may be used for calculating $\bar{y}_1$. Then, $\Sigma_1^4(x_i-\bar{x}_1)(y_i-\bar{y}_1)$, $\Sigma_1^4(x_i-\bar{x}_1)^2$ and $\Sigma_1^4(y_i-\bar{y}_1)^2$ are calculated respectively. Finally, equation 407 may be used for calculating simple linear regression coefficient $b1_1$, and equation 408 may be used for calculating simple linear regression coefficient $b0_1$. There is a total of 3 divisions, 9 multiplications, 12 additions and 13 subtractions when calculating the simple linear regression coefficients on 4 pairs of data elements without any optimization.

The same equations may be used to calculate the simple linear regression coefficients for XY computation set 504 as shown in FIG. 5A Cont'd 1, however XY computation set size 505 is increased to 5. Since the size of XY computation set is increased by 1 compared to the previous XY computation set, the total number of operations is increased accordingly. The calculation includes a total of 3 divisions, 11 multiplications, 16 additions, and 16 subtractions when calculating the simple linear regression coefficients on 5 pairs of data elements without any optimization.

The same equations may be used to calculate the simple linear regression coefficients for XY computation set 506 as shown in FIG. 5A Cont'd 2. XY computation set size 507 is increased to 6. Since the size of XY computation set is increased by 1 compared to the previous XY computation set, the total number of operations is increased accordingly. The calculation includes a total of 3 divisions, 13 multiplications, 20 additions, and 19 subtractions when calculating the simple linear regression coefficients on 6 pairs of data elements without any optimization. Traditional algorithms for calculating simple linear regression coefficients on n pairs of data elements will typically take 3 divisions, 2n+1 multiplications, 4(n−1) additions, and 3n+1 subtractions without any optimization.

FIG. 5B illustrates an example of calculating simple linear regression coefficients using incremental algorithm 1. A mean instead of a sum is used in this example. The calculations for XY computation set 502 use traditional equations to calculate the initial values of components $\bar{x}_1$, $\bar{y}_1$, $XSS_1$, and $SXY_1$. In practice, such calculation will not happen, because incremental simple linear regression coefficient calculation would either start when computation set XY is empty or from where those components have already been calculated when XY computation set is non-empty. Using traditional algorithms to calculate those components on the non-empty computation set XY here is only for the purpose of illustrating the incremental simple linear regression coefficient calculation algorithm. The simple linear regression coefficients of XY computation set 502 are then calculated based on those components. There is a total of 3 divisions, 17 multiplications, 18 additions and 13 subtractions when calculating the simple linear regression coefficients without any optimizations.

However, for XY computation set 504, the components of the simple linear regression may be incrementally calculated. XY computation set size 505 is increased to 5. Equations 415 may be used to directly incrementally calculate mean $\bar{x}_2$ and equation 416 may be used to directly incrementally calculate mean $\bar{y}_2$. Equation 421 may be used for incrementally calculating component $XSS_2$ based on component $XSS_1$ previously calculated and adding a contribution of the added pair of data elements $(x_a, y_a)$ mathematically. Equation 423 may be used for incrementally calculating component $XV_2$ based on component $XSS_2$ and $\bar{x}_2$. Equation 426 may be used for incrementally calculating component $SXY_2$ based on component $SXY_1$ previously calculated and adding a contribution of the added pair of data elements $(x_a, y_a)$ mathematically. Equation 427 may be used for calculating simple linear regression coefficient $b1_2$ based on components $SXY_2$, $XV_2$, $\bar{x}_2$ and $\bar{y}_2$, and equation 428 may be used for calculating simple linear regression coefficient $b0_2$ based on components $b1_2$, $x_2$ and $\bar{y}_2$. The total operations include 3 divisions, 9 multiplications, 5 additions, and 3 subtractions for calculating the incremental simple linear regression coefficients.

The same equations may also be used for incrementally calculating the components of simple linear regression coefficients for XY computation set 506 from the components of simple linear regression coefficients. XY computation set size 507 is increased to 6. Although the computation set size is increased, the number of operations performed by the incremental simple linear regression coefficient calculation algorithm remains constant. There are still 3 divisions, 9 multiplications, 5 additions and 3 subtractions when incrementally calculating the components of simple linear regression coefficients and the simple linear regression coefficients. As such, the number of operations used when incrementally calculating the simple linear regression coefficients is (potentially substantially) less than when using traditional equations.

FIG. 5C illustrates an example of calculating simple linear regression coefficients using incremental algorithm 2. A mean instead of a sum is used in this example. The calculations for XY computation set 502 use traditional equations to calculate the initial values of components $\bar{x}_1, \bar{y}_1$ $SSDX_1$, and $SDXY_1$ then use $SDXY_1$ and $SSDX_1$ to calculate simple linear regression coefficient $b1_1$ and use components $\bar{x}_1$, $\bar{y}_1$ and $b1_1$ to calculate simple linear regression coefficient $b0_1$. For example, equation 405 may be used for calculating mean $\bar{x}_1$ of X variable in XY computation set. Equation 406 may be used for calculating mean $\bar{y}_1$ of Y variable in XY computation set. Equation 429 may be used for calculating $SSDX_1$. Equation 432 may be used for calculating $SDXY_1$. Equation 435 may be used for calculating simple linear regression coefficient $b1_1$ based on components $SDXY_1$ and $SSDX_1$. Equation 436 may be used for calculating simple linear regression coefficient $b0_1$ based on components $\bar{x}_1$, $\bar{y}_1$ and $b1_1$. The total operations include 3 divisions, 9 multiplications, 12 additions, and 13 subtractions for calculating the simple linear regression coefficients on 4 pairs of data elements without any optimization.

However, for XY computation set 504, the components of the simple linear regression coefficients may be incrementally calculated. XY computation set size 505 is increased to 5. Equations 415 may be used to directly incrementally calculate mean $x_2$ and equation 416 may be used to directly incrementally calculate mean $\bar{y}_2$. Equation 431 may be used for directly incrementally calculating component $SSDX_2$ based on components $SSDX_1$, $\bar{x}_2$ and $\bar{x}_1$ previously calculated and adding a contribution of the added pair of data elements $(x_a, y_a)$ mathematically. Equation 434 may be used for incrementally calculating component $SDXY_2$ based on components $SDXY_1$, $\bar{x}_1$ and $\bar{y}_1$ previously calculated and adding a contribution of the added pair of data elements $(x_a, y_a)$ mathematically. Equation 435 may be used for calculating simple linear regression coefficient $b1_2$ based on components $SDXY_2$ and $SSDX_2$. Equation 436 may be used for calculating simple linear regression coefficient $b0_2$ based on components $b1_2$, $x_2$ and $y_2$. The total operations include 3 divisions, 6 multiplications, 5 additions and 5 subtractions for calculating the incremental simple linear regression coefficients.

The same equations may also be used for incrementally calculating the components of simple linear regression coefficients for XY computation set 506 from the components of simple linear regression coefficients for XY computation set 504. XY computation set size 507 is increased to 6. Although the computation set size is increased, the number of operations performed by the incremental simple linear regression coefficient calculation algorithm remains constant. There are still 3 divisions, 6 multiplications, 5 additions and 5 subtractions when incrementally calculating the components of simple linear regression coefficients. As such, the number of operations used when incrementally calculating the simple linear regression coefficients is (potentially substantially) less than when using traditional equations.

FIG. 5D illustrates an example of calculating simple linear regression coefficients using incremental algorithm 3. A mean instead of a sum is used in this example. The calculations for XY computation set 502 use traditional equations to calculate the initial values of components $\bar{x}_1$, $\bar{y}_1$, $XSS_1$, and $SXY_1$ and then use these components to calculate simple linear regression coefficients $b1_1$ and $b0_1$. For example, equation 405 may be used for calculating mean $\bar{x}_1$ of X variable in XY computation set 502. Equation 406 may be used for calculating mean $\bar{y}_1$ of Y variable in XY computation set 502. Equation 437 may be used for calculating $XSS_1$. Equation 440 may be used for calculating $SXY_1$. Equation 443 may be used for calculating simple linear regression coefficient $b1_1$ based on components $SXY_1$, $\bar{x}_1$, $\bar{y}_1$, and $XSS_1$. Equation 444 may be used for calculating simple linear regression coefficient $b0_1$ based on components $\bar{x}_1$, $\bar{y}_1$ and $b1_1$. The total operations include 3 divisions, 13 multiplications, 12 additions, and 2 subtractions for calculating the simple linear regression coefficients on 4 pairs of data elements without any optimization.

However, for XY computation set 504, the components of the simple linear regression coefficients may be incrementally calculated. XY computation set size 505 is increased to 5. Equations 417 may be used to incrementally calculate mean $\bar{x}_2$ and equation 418 may be used to incrementally calculate mean $\bar{y}_2$. Equation 439 may be used for directly incrementally calculating component $XSS_2$ based on components $XSS_1$ previously calculated and adding a contribution of the added pair of data elements $(x_a, y_a)$ mathematically. Equation 442 may be used for directly incrementally calculating component $SXY_2$ based on components $SXY_1$ previously calculated and adding a contribution of the added pair of data elements $(x_a, y_a)$ mathematically. Equation 443 may be used for indirectly incrementally calculating simple linear regression coefficient $b1_2$ based on components $SXY_2$, $\bar{x}_2, \hat{y}_2$, and $XSS_2$. Equation 444 may be used for calculating simple linear regression coefficient $b0_2$ based on components $b1_2$, $\bar{x}_2$ and $\bar{y}_2$. The total operations include 3 divisions, 9 multiplications, 5 additions, and 3 subtractions for calculating the incremental simple linear regression coefficients.

The same equations may also be used for incrementally calculating the components of simple linear regression coefficients for XY computation set 506 from the components of simple linear regression coefficients. XY computation set size 507 is increased to 6. Although the computation set size is increased, the number of operations performed by the incremental algorithm remains constant. There are still 3 divisions, 9 multiplications, 5 additions and 3 subtractions when incrementally calculating the components of simple linear regression coefficients. As such, the number of operations used when incrementally calculating the simple linear regression coefficients is (potentially substantially) less than when using traditional equations.

FIG. 6 illustrates computational loads for traditional simple linear regression coefficient calculation algorithm and incremental simple linear regression coefficient calculation algorithms for n=6. As depicted, there are fewer multiplication, addition, and subtraction operations using any one of the incremental algorithms compared to the traditional algorithm.

FIG. 7 illustrates computational loads for traditional simple linear regression coefficient calculation algorithm and incremental simple linear regression coefficient calculation algorithms for n=1,000,000. As depicted, there are substantially fewer multiplication, addition, and subtraction operations using any one of the incremental algorithms compared to the traditional algorithm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computing system comprising one or more computing devices, each of the computing devices comprising one or more processors, the computing system comprising one or more storage media, the computing system having one or two data sets stored on the one or more storage media or having access to one or two data streams, the computing system maintaining a computation set size counter, the computation set size counter indicating a number of pairs of data elements in a computation set of the one or two data sets or the one or two data streams, each of said pairs of data elements containing an observation of an independent variable and an observation of a dependent variable, a computing-system-implemented method for calculating simple linear regression coefficients for data elements in the computation set, the method comprising:

initialize, by the computing-device-based computing system, one or more components of simple linear regression coefficients for the computation set;

accessing or receiving, by the one or more processor-based computing systems, a pair of data elements;

modifying, by the computing-device-based computing system, the computation set by:

adding the accessed or received pair of data elements to the computation set;

modifying the computation set size counter;

incrementally deriving, by the computing-device-based computing system and based at least in part on the one or more components of simple linear regression coefficients for the computation set, one or more components of simple linear regression coefficients for the modified computation set, wherein the incrementally deriving includes:

accessing the one or more components;

adding a contribution of the added pair of data elements to each of the one or more components mathematically; and providing, by the computing-device-based computing system and based on one or more of the incrementally derived components of simple linear regression coefficients for the modified computation set, simple linear regression coefficients for the modified computation set.

2. The computing-system-implemented method of claim 1, wherein the providing simple linear regression coefficients further comprises indirectly incrementally deriving, by the computing-device-based computing system, one or more components of simple linear regression coefficients for the modified computation set, wherein the indirectly incrementally deriving of the one or more components includes individually calculating each respective one of the one or more components based on one or more components other than the respective one component; and providing, by the computing-device-based computing system and based on one or more of the incrementally derived components of the modified computation set, simple linear regression coefficients for the modified computation set.

3. The computing-system-implemented method of claim 1, wherein the accessing or receiving a pair of data elements comprises accessing or receiving one or more of a group that includes one or more pairs of stock quotes, audio data, video data, geospatial data, web data, mobile communication data, online gaming data, banking transaction data, sensor data, and closed-captioning data.

4. The computing-system-implemented method of claim 1, wherein the incrementally deriving one or more components of simple linear regression coefficients for the modified computation set includes incrementally calculating a sum or a mean for one of the variables in the modified computation set by adding a contribution of the added pair of data elements to the sum or the mean for the variable in the computation set mathematically.

5. The computing-system-implemented method of claim 1, wherein the accessing or receiving a pair of data elements to be added to the computation set includes accessing or receiving a plurality of z (z>1) pairs of data elements, and wherein the method further comprises performing, for each pair of the respective z pairs of data elements, the modifying of the computation set and the computation set size counter, the incrementally deriving of the one or more components for the modified computation set, and the determining of simple linear regression coefficients for the modified computation set.

6. The computing-system-implemented method of claim 1, wherein the accessing or receiving a pair of data elements to be added to the computation set includes accessing or receiving a plurality of z (z>1) pairs of data elements, and wherein the method further comprises performing, for each pair of the respective z pairs of data elements, the modifying of the computation set and the computation set size counter, and the incrementally deriving of the one or more components for the modified computation set.

7. A computing device, the computing device comprising:
   one or more processors;
   one or more storage media;
   a computation set size counter which indicates a quantity of pairs of data elements in a computation set of one or two data sets on the one or more storage media or one or two data streams, each of said pairs of data elements containing an observation of an independent variable and an observation of a dependent variable; and
   one or more calculation modules that, when executed by at least one of the one or more processors, determines simple linear regression coefficients for the computation set, wherein determination of the simple linear regression coefficients includes to:

a. initialize one or more components of simple linear regression coefficients for the computation set;

b. access or receive a pair of data elements to be added to the computation set;

c. modify the computation set by adding the accessed or received pair of data elements to the computation set and modifying the computation set size counter;

d. incrementally calculate one or more components of simple linear regression coefficients for the modified computation set based at least in part on the one or more components for the computation set, wherein direct incremental calculation of the one or more components includes to add a contribution of the pair of data elements added to the computation set to each of the one or more components mathematically; and e. provide, based on one or more of the incrementally calculated components for the modified computation set, simple linear regression coefficients for the modified computation set.

8. The computing device of claim 7, wherein to provide simple linear regression coefficients further comprises to:
indirectly incrementally calculate one or more components of simple linear regression coefficients for the modified computation set, wherein indirectly incrementally calculating one or more components includes individually calculating each respective one of the one or more components based on one or more components other than the respective one component; and
provide, based on one or more of the incrementally calculated components for the modified computation set, simple linear regression coefficients for the modified computation set.

9. The computing device of claim 7, wherein incremental calculation of the one or more components for the modified computation set includes to calculate a sum or a mean for one of the variables in the modified computation set by addition of a contribution of the added pair of data elements the sum or the mean for the variable in the computation set.

10. The computing device of claim 7, wherein the one or more calculation modules, when executed by at least one of the one or more processors, perform b, c, d and e multiple times.

11. The computing device of claim 7, wherein the one or more calculation modules, when executed by at least one of the one or more processors, perform b, c and d multiple times.

12. A computing device program product for use at one or more computing devices, the computing devices comprising one or more processors and one or more storage media, the one or more storage media comprising a specified computation set size counter which indicates a quantity of pairs of data elements in a computation set of one or two data sets on the one or more storage media or one or two data streams, each of said pairs of data elements containing an observation of an independent variable and an observation of a dependent variable, the computing device program product for implementing a method for generating simple linear regression coefficients for data elements in the computation set, the computing device program product comprising one or more non-transitory computing-device-readable storage media having stored thereon computing-device-executable instructions that, when executed by the one or more configured computing devices, cause the one or more configured computing devices to perform the method, the method including to:
initialize, by the one or more configured computing devices, one or more components of simple linear regression coefficients for the computation set;
access or receive, by the one or more configured computing devices, a pair of data elements to be added to the computation set;
modify, by the one or more configured computing devices, the computation set via adding the accessed or received pair of data elements to the computation set and modifying the computation set size counter;
incrementally calculate, by the one or more configured computing devices, one or more components of simple linear regression coefficients for the modified computation set based at least in part on the one or more components initialized or calculated for the computation set, including to:
access the one or more components; and
add a contribution of the pair of data elements added to the computation set to each of the one or more components mathematically;
generate and provide, by the one or more configured computing devices, simple linear regression coefficients for the modified computation set based on one or more of the incrementally calculated components.

13. The computing device program product of claim 12, wherein the generating and providing simple linear regression coefficients further comprises to:
indirectly incrementally calculate, by the one or more configured computing devices, one or more components of simple linear regression coefficients for the modified computation set, wherein indirectly incrementally calculating the one or more components includes individually calculating each respective one of the one or more components based on one or more components other than the respective one component; and
generate and provide, by the one or more configured computing devices, simple linear regression coefficients for the modified computation set based on one or more of the incrementally calculated components.

14. The computing device program product of claim 12, wherein the incrementally calculating one or more components of simple linear regression coefficients for the modified computation set includes incrementally calculating a sum or a mean for one of the variables in the modified computation set by adding a contribution of the added pair of data elements to the sum or the mean for the variable in the computation set mathematically.

15. The computing device program product of claim 12, wherein the computing-device-executable instructions that, when executed, further cause the one or more configured computing devices to access or receive a pair of data elements to be added to the computation set, to modify the computation set and the computation set size counter, to incrementally calculate the one or more components, and to generate and provide simple linear regression coefficients for the modified computation set for each of multiple pairs of data elements to be accessed or received.

16. The computing device program product of claim 12, wherein the computing-device-executable instructions that, when executed, further cause the one or more configured computing devices to access or receive a pair of data elements to be added to the computation set, to modify the computation set and the computation set size counter, and to incrementally calculate the one or more components for the modified computation set for each of multiple pairs of data elements to be accessed or received.

* * * * *